United States Patent
Manolakos et al.

(10) Patent No.: US 11,909,685 B2
(45) Date of Patent: *Feb. 20, 2024

(54) SIGNALING OF RECEPTION-TO-TRANSMISSION MEASUREMENTS FOR ROUND-TRIP-TIME (RTT)-BASED POSITIONING

(71) Applicant: QUALCOMM Incorporated, San Diego, CA (US)

(72) Inventors: Alexandros Manolakos, Escondido, CA (US); Sony Akkarakaran, Poway, CA (US); Sven Fischer, Nuremberg (DE); Jay Kumar Sundararajan, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/718,029

(22) Filed: Apr. 11, 2022

(65) Prior Publication Data
US 2022/0239436 A1 Jul. 28, 2022

Related U.S. Application Data

(63) Continuation of application No. 16/739,054, filed on Jan. 9, 2020, now Pat. No. 11,368,267.

(30) Foreign Application Priority Data

Jan. 11, 2019 (GR) ............................... 20190100017

(51) Int. Cl.
*H04L 5/00* (2006.01)
*H04W 64/00* (2009.01)
(Continued)

(52) U.S. Cl.
CPC .......... *H04L 5/0048* (2013.01); *H04L 47/283* (2013.01); *H04W 64/003* (2013.01);
(Continued)

(58) Field of Classification Search
CPC ... H04L 5/0048; H04L 5/0023; H04L 47/283; H04W 64/003; H04W 72/21; H04W 72/23; H04W 88/04; H04W 64/00
(Continued)

(56) References Cited

U.S. PATENT DOCUMENTS 6,681,099 B1   1/2004  Keranen et al.
7,254,401 B2   8/2007  Keranen et al.
(Continued)

FOREIGN PATENT DOCUMENTS

CN   1444833 A   9/2003
CN   1913705 A   2/2007
(Continued)

OTHER PUBLICATIONS

CATT: "Discussion of Potential Techniques for NR Positioning", 3GPP Draft, R1-1812615, NR Pos Techniques, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051554571, 13 pages, Retrieved from the Internet: URL: http://www.3gpp.org/ftp/Meetings%5F3GPP%5FSYNC/RAN1/Docs/R1%2D1812615%2Ezip. [retrieved on Nov. 11, 2018] paragraph [0002]—paragraph [0004].
(Continued)

*Primary Examiner* — Rownak Islam
(74) *Attorney, Agent, or Firm* — Muncy, Geissler, Olds,& Lowe, P.C.

(57) ABSTRACT

Disclosed are techniques for signaling of reception-to-transmission measurements from gNBs and user equipments
(Continued)

(UEs) for round trip time (RTT) based positioning in wireless networks such as new radio (NR). In multi-RTT positioning, the flow of messages that are exchanged differ depending on the entity acting as the location server determining the position of the UE.

28 Claims, 20 Drawing Sheets

(51) Int. Cl.
    *H04W 88/04* (2009.01)
    *H04L 47/283* (2022.01)
    *H04W 72/21* (2023.01)
    *H04W 72/23* (2023.01)
(52) U.S. Cl.
    CPC ........... *H04W 72/21* (2023.01); *H04W 72/23* (2023.01); *H04W 88/04* (2013.01)
(58) Field of Classification Search
    USPC ......................................................... 370/329
    See application file for complete search history.

(56) References Cited

U.S. PATENT DOCUMENTS

| | | | |
|---|---|---|---|
| 8,744,481 | B2 | 6/2014 | Baldemair et al. |
| 2009/0131078 | A1 | 5/2009 | Yang |
| 2014/0200026 | A1* | 7/2014 | Aldana ................. H04W 64/00 455/456.1 |
| 2014/0274160 | A1 | 9/2014 | Xiao et al. |
| 2020/0228271 | A1 | 7/2020 | Manolakos |
| 2020/0322756 | A1 | 10/2020 | Sosnin et al. |
| 2022/0239435 | A1 | 7/2022 | Manolakos et al. |

FOREIGN PATENT DOCUMENTS

| | | |
|---|---|---|
| CN | 102077663 A | 5/2011 |
| CN | 103139905 A | 6/2013 |
| CN | 108683482 A | 10/2018 |

OTHER PUBLICATIONS

Ericsson: "CR 25.215-007r01: Ranges and Resolution of Timing Measurements", TSG-RAN Working Group 1 meeting #9, TSGR1#9(99)j41, Dresden, Germany, Nov. 30-Dec. 3, 1999, 6 Pages.
Intel Corporation: "Techniques for NR Positioning", 3GPP TSG RAN WG1 Meeting #94bis, 3GPP Draft, R1-1810801, Intel—NR Pos Techniques, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518206, 12 Pages, Retrieved from Internet: URL: http://www.3gpp.org/ftp/tsg%5Fran/WG1%5FRL1/TSGR1%5F94b/Docs/R1%2D1810801%2Ezip. [retrieved Sep. 29, 2018] paragraph [05.5].
International Preliminary Report on Patentability—PCT/US2020/013233 The International Bureau of WIPO—Geneva, Switzerland, dated Jul. 22, 2021.
International Search Report and Written Opinion—PCT/US2020/013233—ISA/EPO—dated Apr. 7, 2020.
QC Inc.: "Combined Down&Uplink NR Position Proc's",3GPPDraft,3GPPTSG-RAN WG2 Mtg104,R2-1817899 (Position Procedures),3rd Gen Partner Proj(3GPP),Mobile Comp Cntr,650,Route Des Lucioles,F06921Sophia-Antipolis Cedex,FR,vol. RAN WG2,No. Spokane,USA,Nov. 12, 2018-Nov. 16, 2018,Nov. 2, 2018(Nov. 2, 2018)XP051481785,pp. 1-18,from Internet: URL:https://www.3gpp.org/ftp/tsg_ran/wg2_rl2/TSGR2_104/Docs/R2-1817899.zip,http://www.3gpp.org/ftp/tsg%5Fran/WG2%5FRL2/TSGR2%5F184/Docs/R2%2D1817899%2Ezip[Nov. 2, 2018]para[001][004],p. 4, Fig 1-5,fig 4.
Qualcomm Inc.: "NG-RAN Positioning Architecture and Procedures", 3GPP Draft, 3GPP TSG-RAN WG2 Mtg #104, R2-1817898, (NG-RAN Positioning Architecture), 3rd Generation Partnership Project (3GPP), Mobile Competence Centre,650,Route Des Lucioles,F-06921 Sophia-Antipolis Cedex,FR,vol. RAN WG2.No. Spokane,USA, Nov. 12, 2018 -Nov. 16, 2018, Nov. 12, 2018(Nov. 12, 2018), XP051557411, 17 pages, Retrieved from Internet:URL:http://www.3gpp.org/ftp/Mtgs%5F3GPP%5FSYNC/RAN2/Docs/R2%2D1817898%2Ezip.[retrieved on Nov. 12, 2018]para [09.2]-para [9.3x7.2].
ZTE: "Correction for UE Positioning Measurement", 3GPP TSG-RAN WG2 Meeting #53, R2-061231, Shanghai, China, May 8-May 12, 2006, 12 Pages.

* cited by examiner

SIGNALING OF RECEPTION-TO-TRANSMISSION MEASUREMENTS FOR ROUND-TRIP-TIME (RTT)-BASED POSITIONING

CROSS-REFERENCE TO RELATED APPLICATIONS

The present Application for Patent is a continuation of U.S. patent application Ser. No. 16/739,054, entitled "SIGNALING OF RECEPTION-TO-TRANSMISSION MEASUREMENTS FOR ROUND-TRIP-TIME (RTT)-BASED POSITIONING," filed Jan. 9, 2020, which claims priority to Greek Patent Application No. 20190100017, entitled "MEASUREMENT SIGNALING OF RX-TX FROM GNBS AND UES FOR RTT-BASED POSITIONING," filed Jan. 11, 2019, each of which is assigned to the assignee hereof, and expressly incorporated herein by reference in its entirety.

INTRODUCTION

1. Technical Field

Various aspects described herein generally relate to wireless communication systems, and more particularly, to measurement signaling of Rx-Tx from gNodeBs (gNBs) and user equipments (UEs) for round trip time (RTT) based positioning in wireless networks, e.g., in new radio (NR).

2. Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps).

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device can also be configured to report the time of arrival (ToA) of RF signals.

With OTDOA, when the mobile device reports the time difference of arrival (TDOA) between RF signals from two network nodes, the location of the mobile device is then known to lie on a hyperbola with the locations of the two network nodes as the foci. Measuring TDOAs between multiple pairs of network nodes allows for solving for the mobile device's position as intersections of the hyperbolas.

Round trip time (RTT) is another technique for determining a position of a mobile device. RTT is a technique using both the mobile device and the network node receive-to-transmit (Rx-Tx) time differences to compute the mobile device's position. This allows for computing the back-and-forth flight time between the mobile device and the network node. The location of the mobile device is then known to lie on a circle with a center at the network node's position. Reporting RTTs with multiple network nodes allows the positioning entity to solve for the mobile device's position as the intersections of the circles.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method performed by a positioning entity is disclosed. The method comprises gathering a plurality of transmission-reception point (TRP) round trip time (RTT) related measurements, the plurality of TRP RTT-related measurements being one-to-one associated with a plurality of TRPs, wherein each TRP RTT-related measurement is associated with one TRP of the plurality of TRPs. The method also comprises gathering a plurality of user equipment (UE) RTT-related measurements, wherein each of the plurality of UE RTT-related measurements is associated with one TRP of the plurality of TRPs. The method further comprises determining a position of a UE based on the plurality of TRP RTT-related measurements and the plurality of UE RTT-related measurements. For each TRP of the plurality of TRPs, the TRP RTT-related measurement associated with that TRP represents a duration between that TRP transmitting a downlink reference signal (DL RS) to the UE and that TRP receiving a corresponding uplink reference signal (UL RS) from the UE. Also for each TRP, the UE RTT-related measurement associated with that TRP represents a duration between the UE receiving the DL RS from that TRP and the UE transmitting the corresponding UL RS to that TRP.

An exemplary positioning entity is disclosed. A positioning entity may be a UE or a TRP or a location server or other network entity or some combination thereof. The positioning entity may comprise a transceiver (e.g., when the positioning entity is a UE or TRP) or a network interface (e.g., when the positioning entity is a location server or other network entity) or a combination thereof (e.g., when the positioning entity is a TRP), a memory, and at least one processor. The at least one processor is configured to gather a plurality of TRP RTT-related measurements, the plurality of TRP RTT-related measurements being one-to-one associated with a plurality of TRPs, wherein each TRP RTT-related measurement is associated with one TRP of the plurality of TRPs. The at least one processor is also configured to gather a plurality of UE RTT-related measurements, wherein each of the plurality of UE RTT-related measurements is associated with one TRP of the plurality of TRPs. The at least one processor is further configured to determine a position of a UE based on the plurality of TRP RTT-related measurements and the plurality of UE RTT-related measurements. For each TRP of the plurality of TRPs, the TRP RTT-related measurement associated with that TRP represents a duration between that TRP transmitting a DL RS to the UE and that TRP receiving a corresponding UL RS from the UE. Also for each TRP, the UE RTT-related measurement associated with that TRP represents a duration between the UE receiving the DL RS from that TRP and the UE transmitting the corresponding UL RS to that TRP.

Another exemplary positioning entity is disclosed. The positioning entity comprises means for gathering a plurality of TRP RTT-related measurements, the plurality of TRP RTT-related measurements being one-to-one associated with a plurality of TRPs, wherein each TRP RTT-related measurement is associated with one TRP of the plurality of TRPs. The positioning entity also comprises means for gathering a plurality of UE RTT-related measurements, wherein each of the plurality of UE RTT-related measurements is associated with one TRP of the plurality of TRPs. The positioning entity further comprises means for determining a position of a UE based on the plurality of TRP RTT-related measurements and the plurality of UE RTT-related measurements. For each TRP of the plurality of TRPs, the TRP RTT-related measurement associated with that TRP represents a duration between that TRP transmitting a DL RS to the UE and that TRP receiving a corresponding UL RS from the UE. Also for each TRP, the UE RTT-related measurement associated with that TRP represents a duration between the UE receiving the DL RS from that TRP and the UE transmitting the corresponding UL RS to that TRP.

An exemplary non-transitory computer-readable medium storing computer-executable instructions for a positioning entity is disclosed. The computer-executable instructions comprise one or more instructions causing the positioning entity to gather a plurality of TRP RTT-related measurements, the plurality of TRP RTT-related measurements being one-to-one associated with a plurality of TRPs, wherein each TRP RTT-related measurement is associated with one TRP of the plurality of TRPs. The computer-executable instructions also comprise one or more instructions causing the positioning entity to gather a plurality of UE RTT-related measurements, wherein each of the plurality of UE RTT-related measurements is associated with one TRP of the plurality of TRPs. The computer-executable instructions further comprise one or more instructions causing the positioning entity to determine a position of a UE based on the plurality of TRP RTT-related measurements and the plurality of UE RTT-related measurements. For each TRP of the plurality of TRPs, the TRP RTT-related measurement associated with that TRP represents a duration between that TRP transmitting a DL RS to the UE and that TRP receiving a corresponding UL RS from the UE. Also for each TRP, the UE RTT-related measurement associated with that TRP represents a duration between the UE receiving the DL RS from that TRP and the UE transmitting the corresponding UL RS to that TRP.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
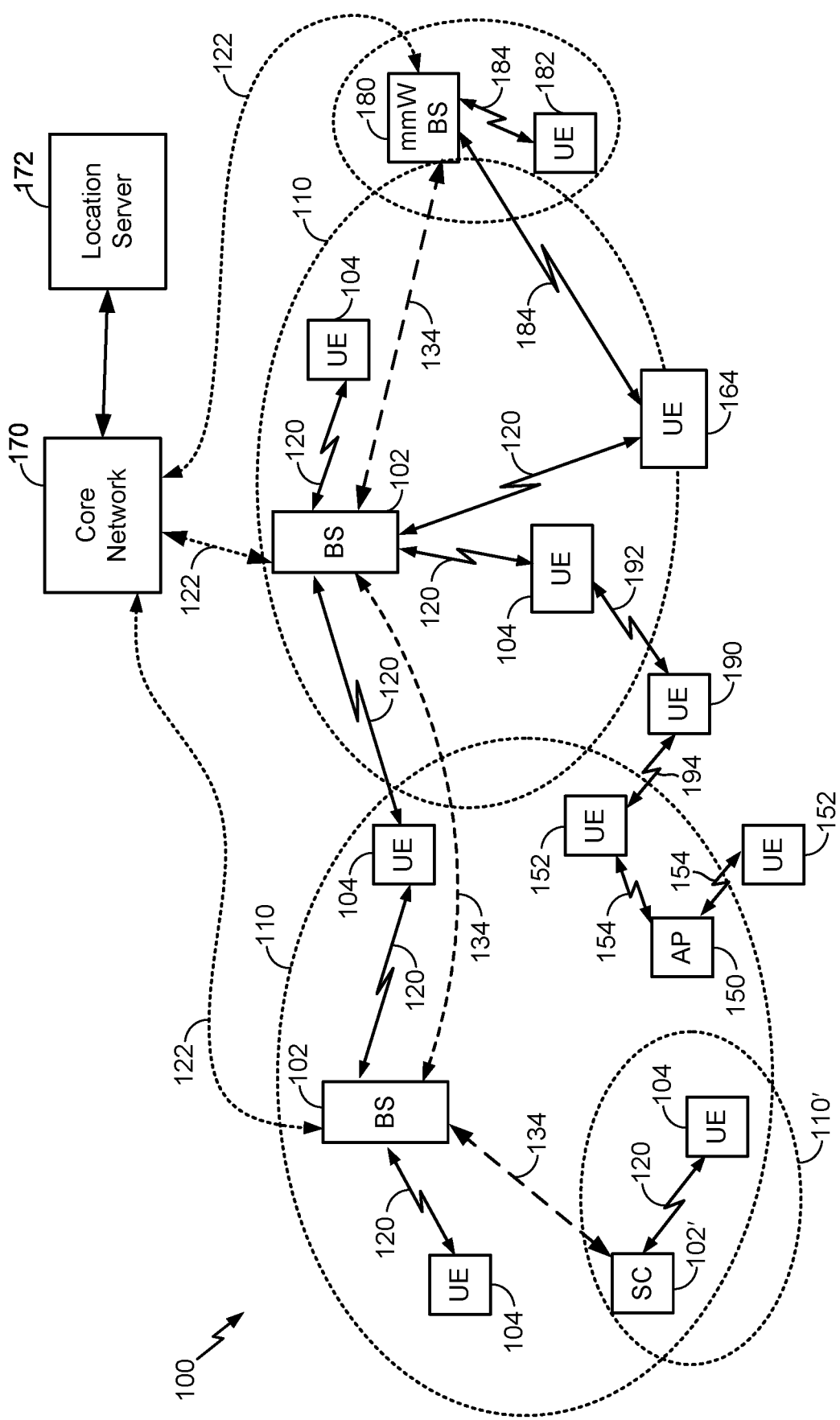
FIG. 1 illustrates an exemplary wireless communications system in accordance with one or more aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
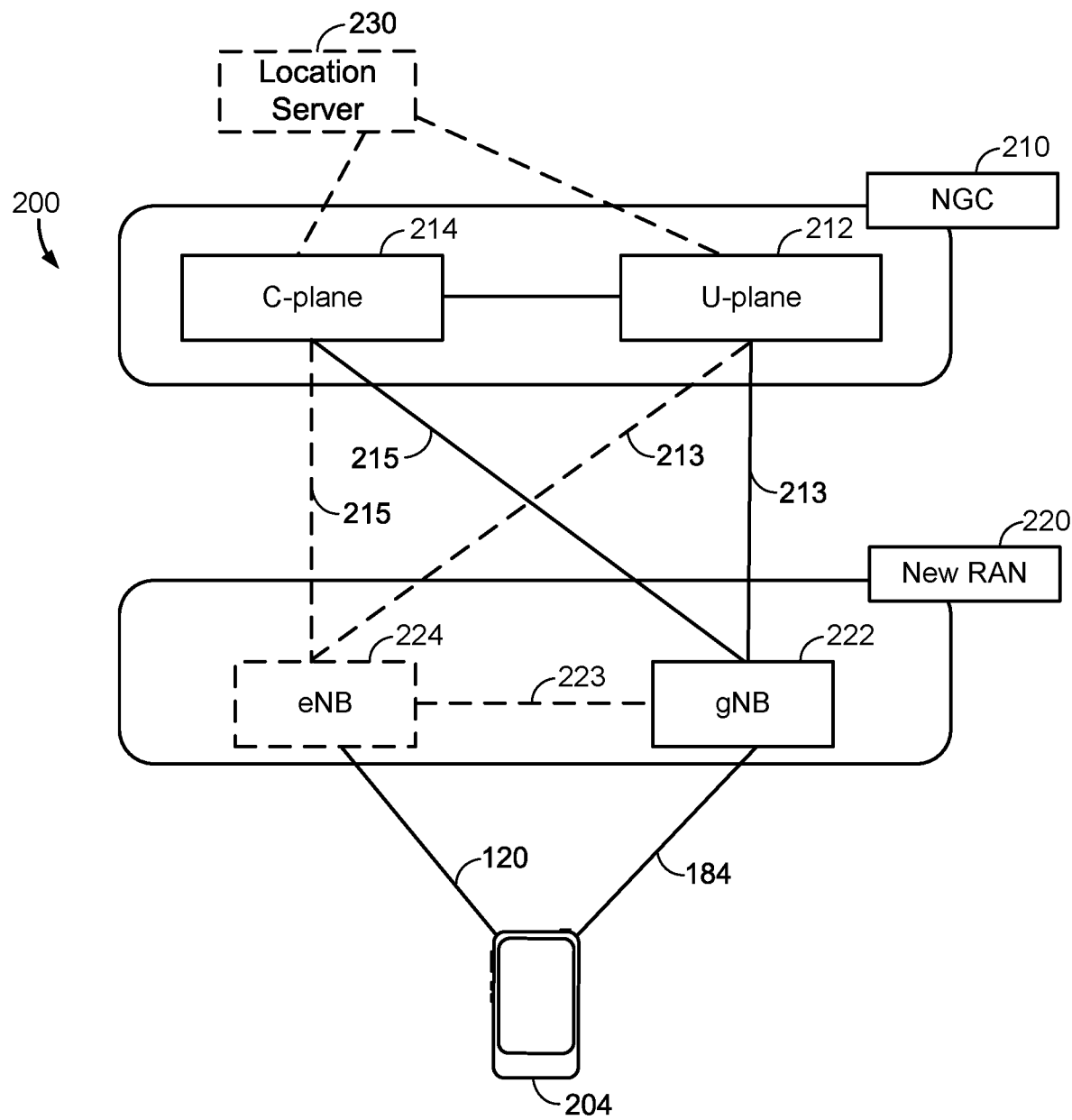
FIGS. 2A and 2B illustrate example wireless network structures in accordance with one or more aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
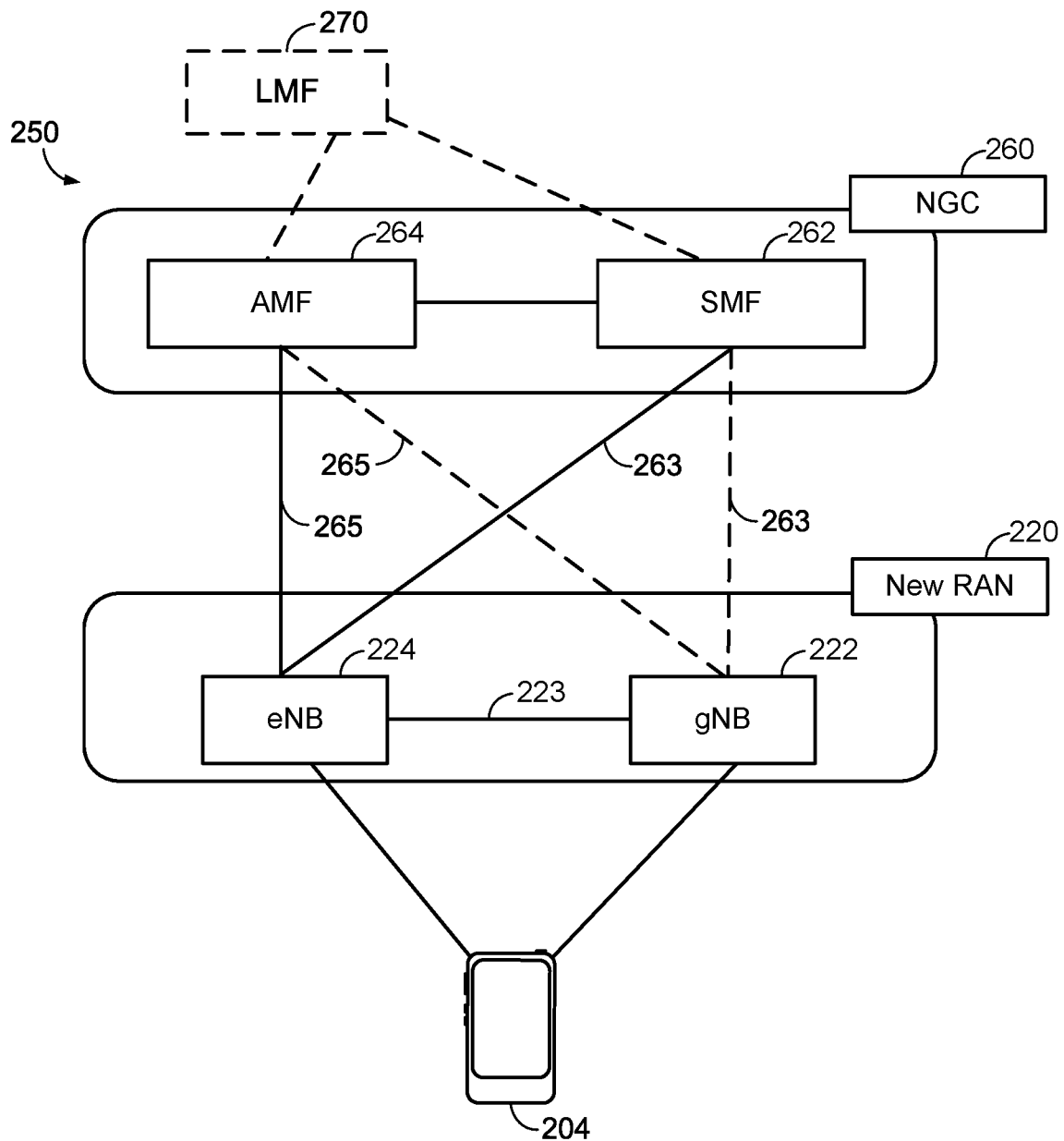

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
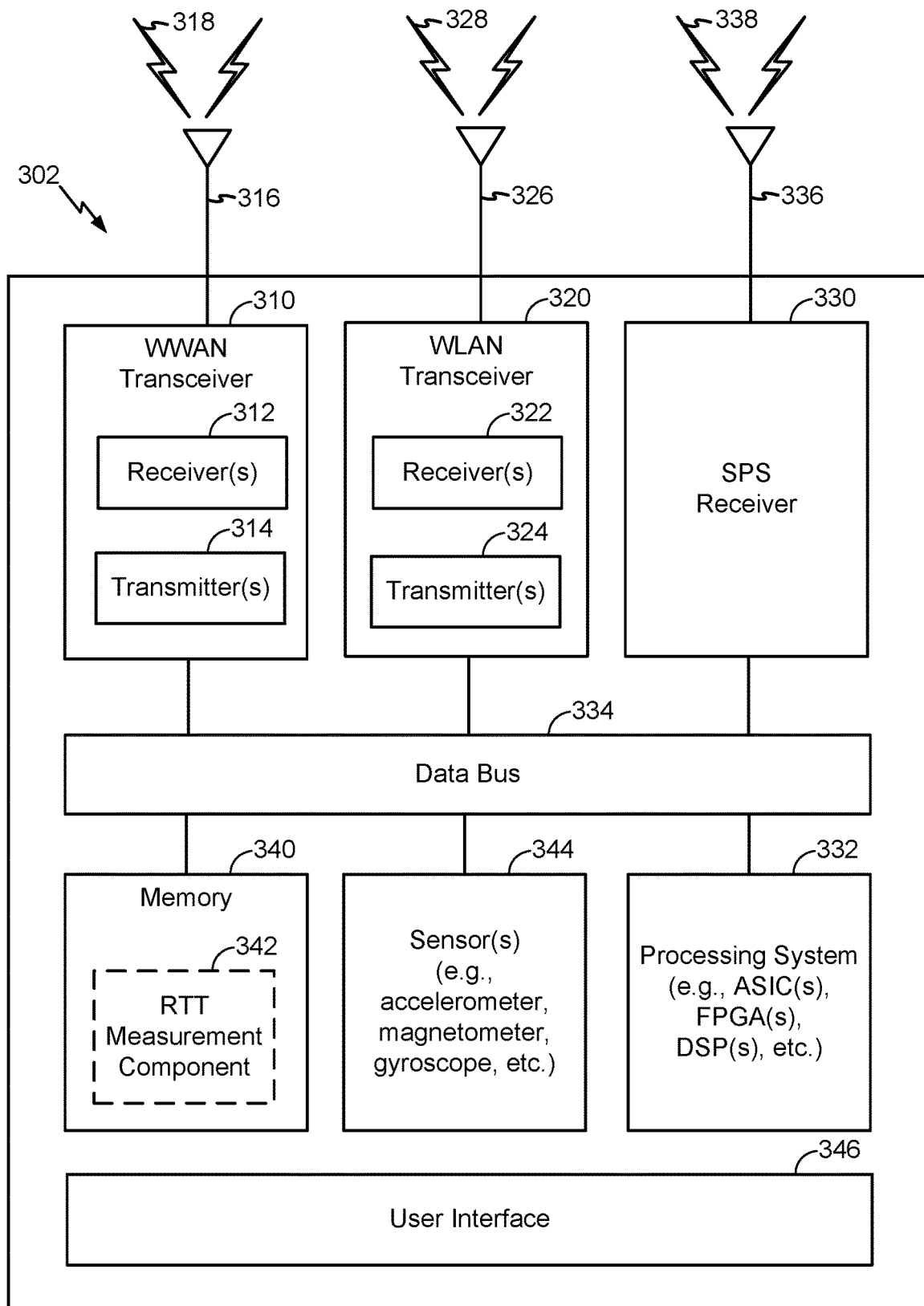
FIGS. 3A to 3C are simplified block diagrams of several sample aspects of components that may be employed in wireless communication nodes and configured to support communication in accordance with one or more aspects of the disclosure.
Figure 3B:
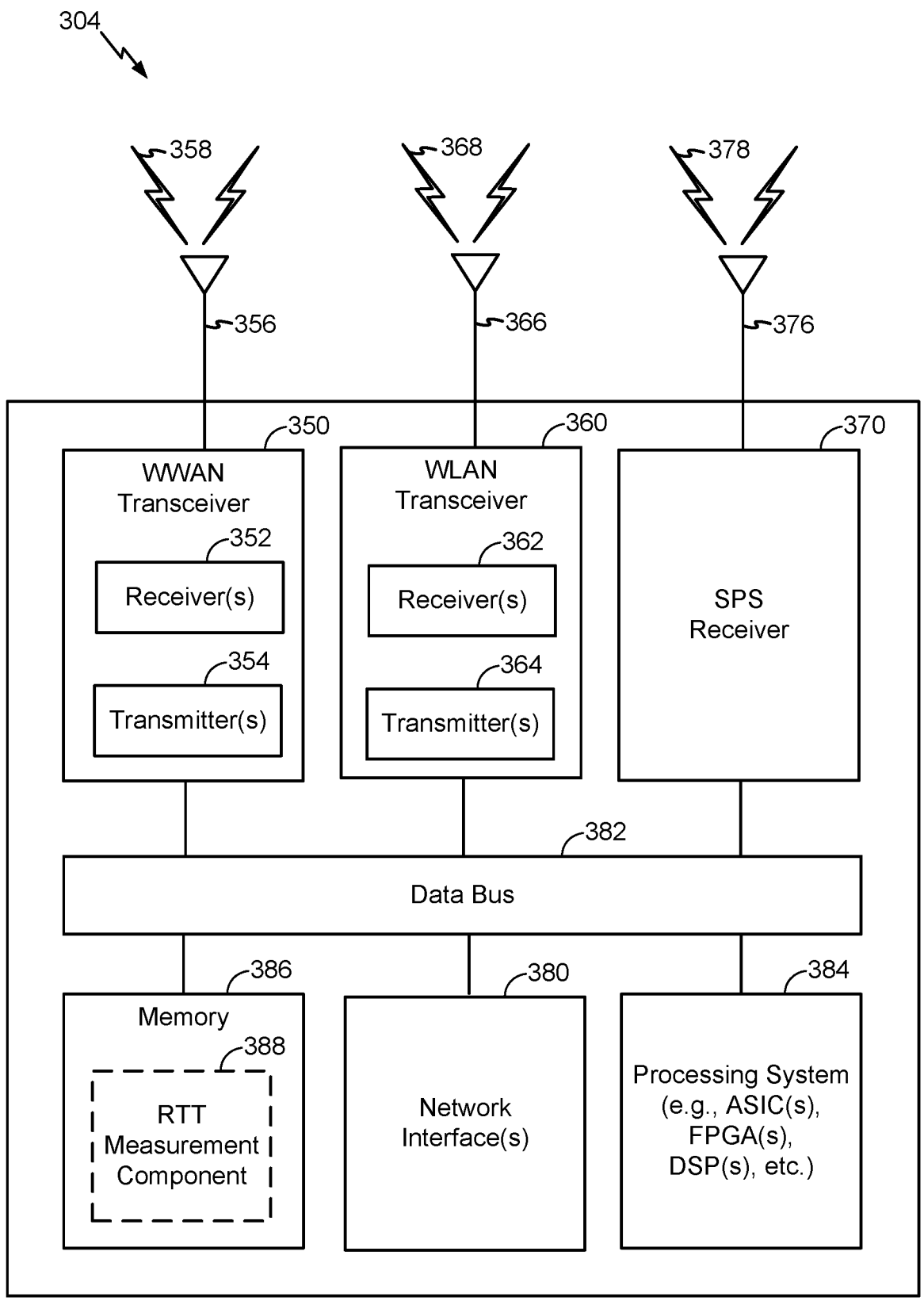
Figure 3C:
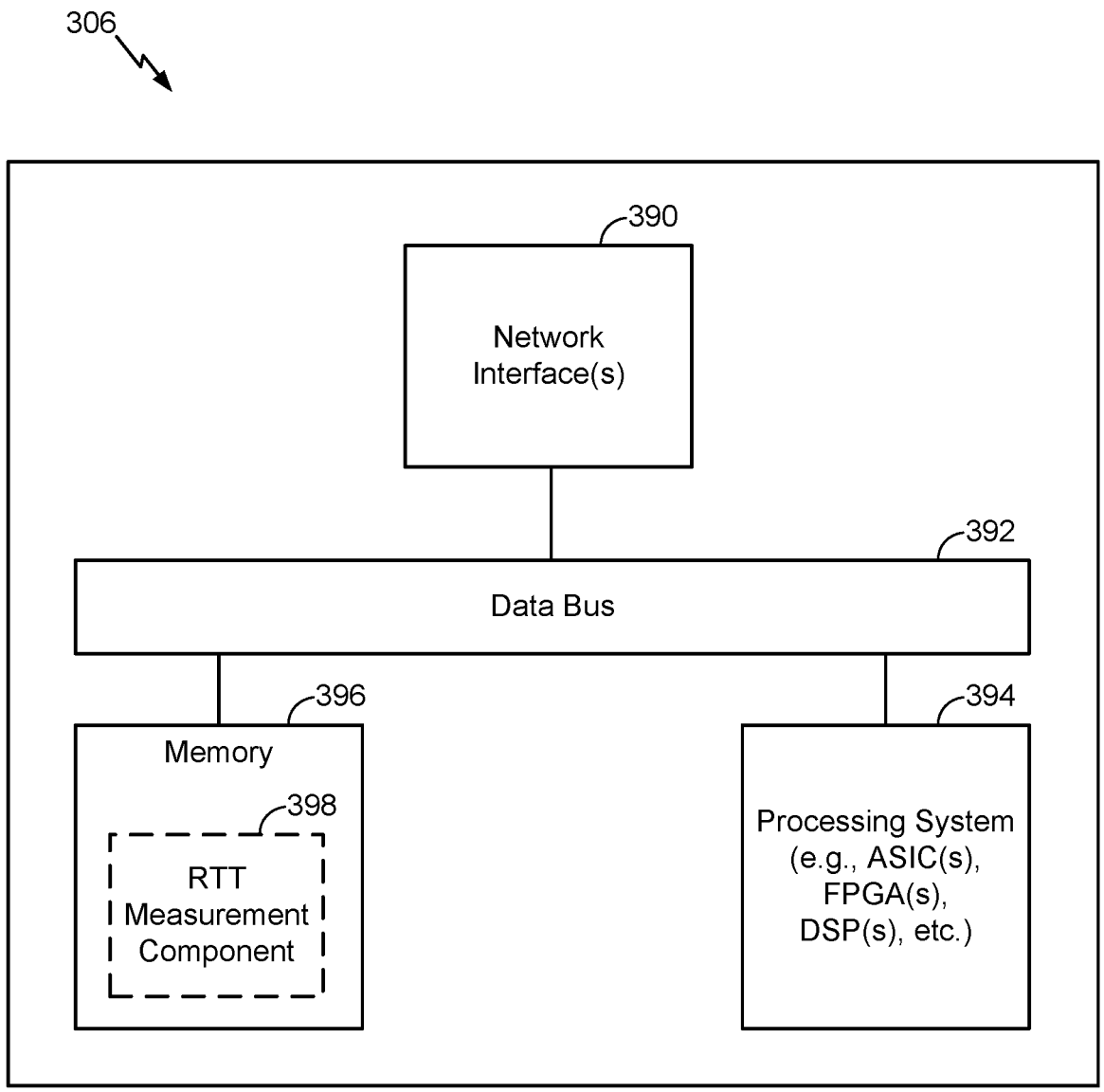

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The apparatuses 302, 304, and 306 also include other components that may be used in conjunction with the operations as disclosed herein. The UE 302 includes processor circuitry implementing a processing system 332 for providing functionality relating to, for example, sounding reference signals (SRS) transmissions as disclosed herein, and for providing other processing functionality. The base station 304 includes a processing system 384 for providing functionality relating to, for example, SRS configuration and reception as disclosed herein, and for providing other processing functionality. The network entity 306 includes a processing system 394 for providing functionality relating to, for example, SRS configuration as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include RTT measurement components 342, 388, and 398, respectively. The RTT measurement components 342, 388, and 398 may be hardware circuits that are part of or coupled to the processing systems 332, 384, and 394, respectively, that, when executed, cause the apparatuses 302, 304, and 306 to perform the functionality described herein. Alternatively, the RTT measurement components 342, 388, and 398 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the FBS detection modules 342, 388, and 398, etc.

Figure 4:
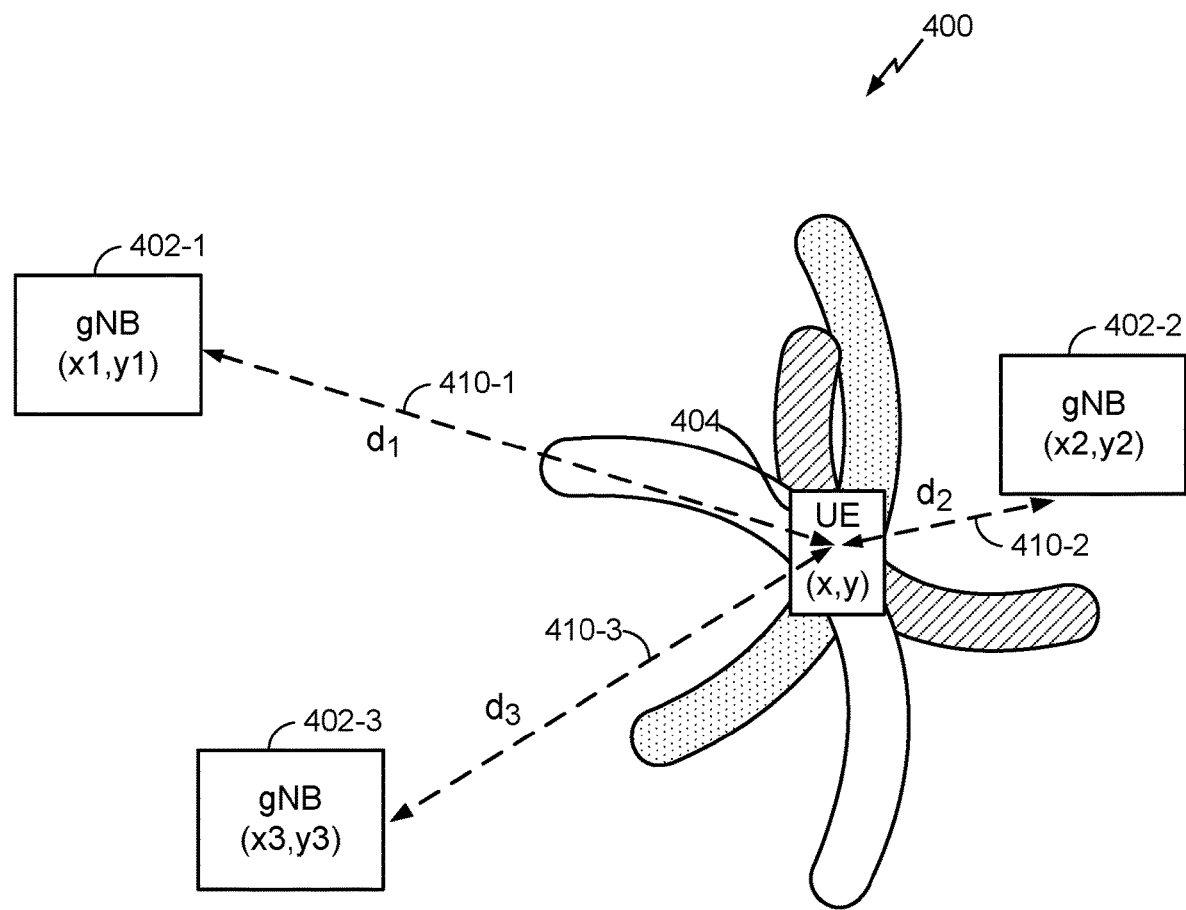
FIG. 4 illustrates a scenario for determining a position of a UE through a multi-RTT procedure in accordance with one or more aspects of the disclosure.

FIG. 4 illustrates an exemplary wireless communications system 400 according to aspects of the disclosure. In the example of FIG. 4, a UE 404 (which may correspond to any of the UEs described herein) is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402-1, 402-2, and 402-3 (collectively, base stations 402, and which may correspond to any of the base stations described herein) using RF signals and standardized protocols for the modulation of the RF signals and the exchange of information packets. By extracting different types of information from the exchanged RF signals, and utilizing the layout of the wireless communications system 400 (i.e., the base stations' locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and three base stations 402, as will be appreciated, there may be more UEs 404 and more base stations 402.

To support position estimates, the base stations 402 may be configured to broadcast reference RF signals (e.g., PRS, NRS, CRS, TRS, CSI-RS, PSS, or SSS, etc.) to UEs 404 in their coverage area to enable a UE 404 to measure characteristics of such reference RF signals. For example, the UE 404 may measure the time of arrival (ToA) of specific reference RF signals (e.g., PRS, NRS, CRS, CSI-RS, etc.) transmitted by at least three different base stations 402-1, 402-2, and 402-3 and may use the RTT positioning method to report these ToAs (and additional information) back to the serving base station 402 or another positioning entity (e.g., location server 230, LMF 270).

In an aspect, although described as the UE 404 measuring reference RF signals from a base station 402, the UE 404 may measure reference RF signals from one of multiple cells supported by a base station 402. Where the UE 404 measures reference RF signals transmitted by a cell supported by a base station 402, the at least two other reference RF signals measured by the UE 404 to perform the RTT procedure would be from cells supported by base stations 402 different from the first base station 402 and may have good or poor signal strength at the UE 404.

In order to determine the position (x, y) of the UE 404, the entity determining the position of the UE 404 needs to know the locations of the base stations 402, which may be represented in a reference coordinate system as ($x_k$, $y_k$), where k=1, 2, 3 in the example of FIG. 4. Where one of the base stations 402 (e.g., the serving base station) or the UE 404 determines the position of the UE 404, the locations of the involved base stations 402 may be provided to the serving base station 402 or the UE 404 by a location server with knowledge of the network geometry (e.g., location server 230, LMF 270). Alternatively, the location server may determine the position of the UE 404 using the known network geometry.

Either the UE 404 or the respective base station 402 may determine the distance 410 ($d_k$, where k=1, 2, 3) between the UE 404 and the respective base station 402. Specifically, the distance 410-1 between the UE 404 and base station 402-1 is $d_1$, the distance 410-2 between the UE 404 and base station 402-2 is $d_2$, and the distance 410-3 between the UE 404 and base station 402-3 is $d_3$. In an aspect, determining the RTT of signals exchanged between the UE 404 and any base station 402 can be performed and converted to a distance 410 ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 404 and the base stations 402 are the same. However, such an assumption may not be true in practice.

Once each distance 410 is determined, the UE 404, a base station 402, or the location server (e.g., location server 230, LMF 270) can solve for the position (x, y) of the UE 404 by using a variety of known geometric techniques, such as, for example, trilateration. From FIG. 4, it can be seen that the position of the UE 404 ideally lies at the common intersection of three semicircles, each semicircle being defined by radius $d_k$ and center ($x_k$, $y_k$), where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 404 from the location of a base station 402). The intersection of the two directions at or near the point (x, y) can provide another estimate of the location for the UE 404.

A position estimate (e.g., for a UE 404) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
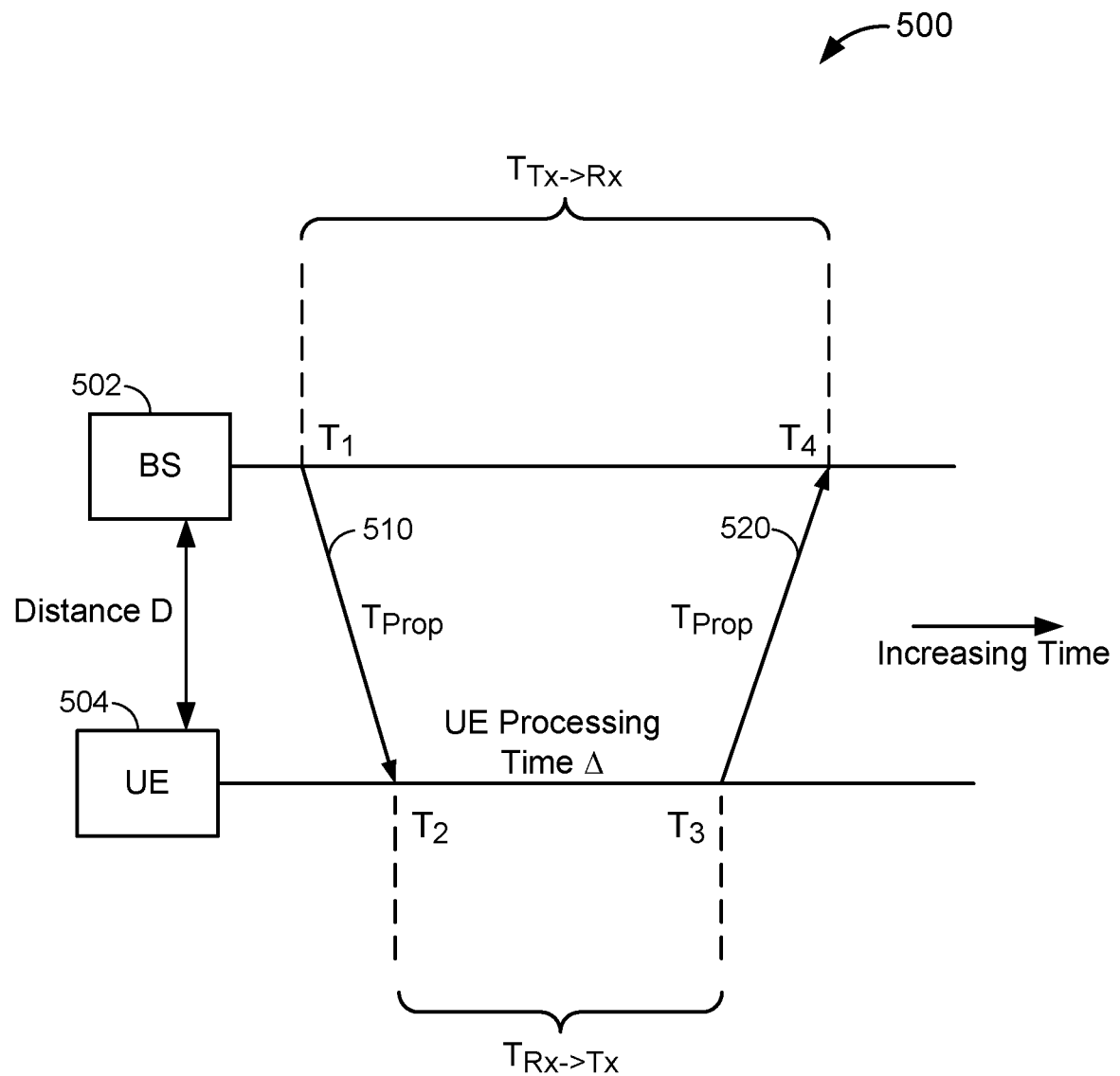
FIG. 5 illustrates a diagram of exemplary timings for determining an RTT between a cell and a UE in accordance with one or more aspects of the disclosure.

FIG. 5 is an exemplary diagram 500 showing exemplary timings of RTT measurement signals exchanged between a base station 502 (e.g., any of the base stations described herein) and a UE 504 (e.g., any of the UEs described herein), according to aspects of the disclosure. In the example of FIG. 5, the base station 502 sends an RTT measurement signal 510 (e.g., PRS, NRS, CRS, CSI-RS, etc.) to the UE 504 at time $T_1$. The RTT measurement signal 510 has some propagation delay $T_{Prop}$ as it travels from the base station 502 to the UE 504. At time $T_2$ (the ToA of the RTT measurement signal 510 at the UE 504), the UE 504 receives/measures the RTT measurement signal 510. After some UE processing time, the UE 504 transmits an RTT response signal 520 (e.g., an SRS, UL-PRS) at time $T_3$. After the propagation delay $T_{Prop}$, the base station 502 receives/measures the RTT response signal 520 from the UE 504 at time $T_4$ (the ToA of the RTT response signal 520 at the base station 502).

In order to identify the ToA (e.g., $T_2$) of an RF signal (e.g., an RTT measurement signal 510) transmitted by a given network node, the receiver (e.g., UE 504) first jointly processes all the resource elements (REs) on the channel on which the transmitter (e.g., base station 502) is transmitting the RF signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the RF signal. Generally, the receiver will use a noise-related quality threshold to filter out spurious local peaks, thereby presumably correctly identifying significant peaks on the channel. For example, the UE 504 may chose a ToA estimate that is the earliest local maximum of the CER that is at least X decibels (dB) higher than the median of the CER and a maximum Y dB lower than the main peak on the channel. The receiver determines the CER for each RF signal from each transmitter in order to determine the ToA of each RF signal from the different transmitters.

The RTT response signal 520 may explicitly include the difference between time $T_3$ and time $T_2$ (i.e., $T_{Rx \rightarrow Tx}$). Alternatively, it may be derived from the timing advance (TA), i.e., the relative UL/DL frame timing and specification location of UL reference signals. (Note that the TA is usually the RTT between the base station 502 and the UE 504, or double the propagation time in one direction.) Using this measurement and the difference between time $T_4$ and time $T_1$ (i.e., $T_{Tx \rightarrow Rx}$), the base station 502 can calculate the distance to the UE 504 as:

$$d = \frac{1}{2c}(T_{Tx \rightarrow Rx} - T_{Rx \rightarrow Tx}) = \frac{1}{2c}(T_2 - T_1) + \frac{1}{2c}(T_4 - T_3) \quad (1)$$

where c is the speed of light.

Note that the UE 504 can perform an RTT procedure with multiple base stations 502. However, the RTT procedure does not require synchronization between these base stations 502.

Figure 6:
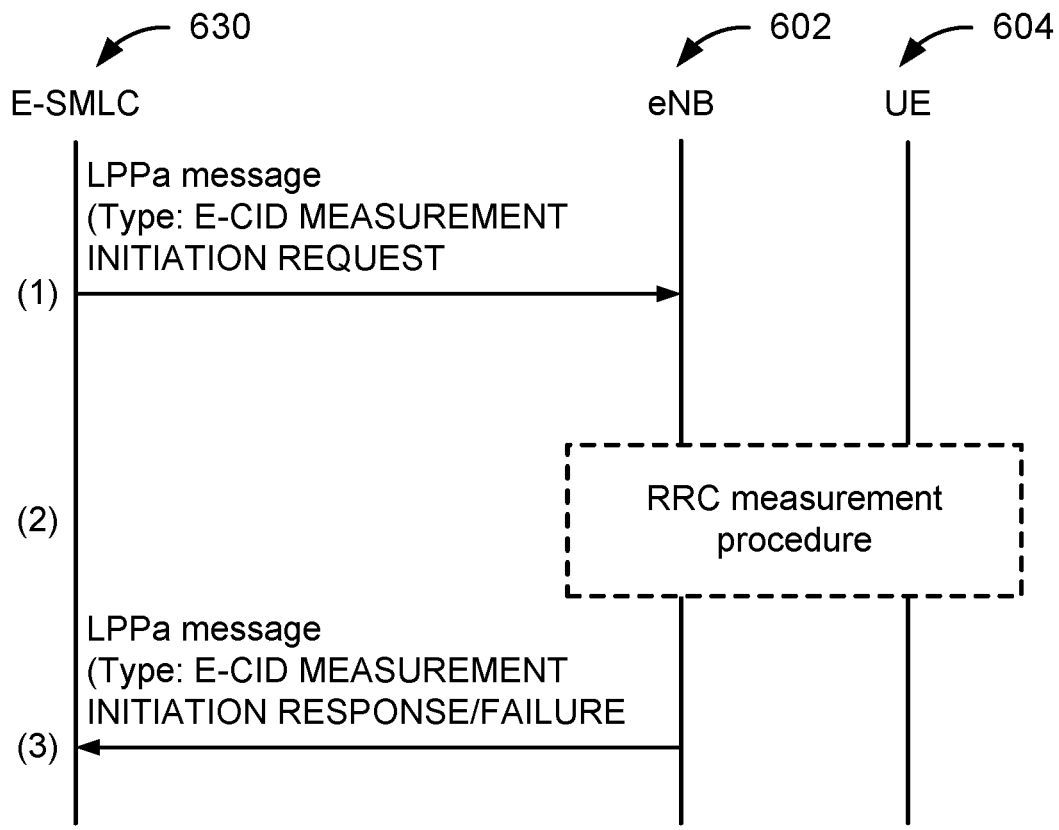
FIG. 6 illustrates a diagram of a conventional E-CID (enhanced cell ID) procedure to determine a position of a UE.

In conventional wireless networks (e.g., 4G LTE), an uplink enhanced cell ID (E-CID) procedure can be performed to determine the location of a UE. In this procedure, which is illustrated in FIG. 6, the following operations are performed:

At stage (1), the location server (e.g., an evolved serving mobile location center (E-SMLC) 630) sends an E-CID measurement initiation request to the serving gNB 602 over the LTE positioning protocol type A (LPPa) interface.

At stage (2), the UE 604 (e.g., any of the UEs described herein) reports to the serving eNB 603 (e.g., any of the base stations described herein) the $UE_{Rx-Tx} = T_{UE,Rx} - T_{UE,Tx}$ measurement;

Also at stage (2), the eNB 602 receives the $UE_{Rx-Tx}$ measurement and adds the $eNB_{Rx-Tx} = T_{eNB,Rx} - T_{eNB,Tx}$ measurement to derive $T_{adv} = UE_{Rx-Tx} + eNB_{Rx-Tx}$;

At stage (3), the eNB sends an E-CID measurement initiation response message to report the $T_{adv}$ to the E-SMLC 630 to enable the E-SMLC 630 to perform the positioning (i.e., estimate the location of the UE 604).

The eNB 602 can also report the angle-of-arrival (AoA), and the location server can determine the UE's 604 position based on the $T_{adv}$ and the AoA. In LTE, the UE 604 reports the $UE_{Rx-Tx}$, referred to as "ue-RxTxtimediff," only for the serving eNB 602.

However, in multi-RTT positioning, multiple RTTs are utilized to determine the position of the UE. More specifically, a plurality of RTT-related measurements between a plurality of cells (or TRPs) and a UE are provided to a positioning entity that determines the position of the UE. The positioning entity may be the UE itself or a location server (LCS) of a wireless network. The LCS may reside in a serving cell or may be a separate entity outside of the serving cell(s) (e.g., location server 230, LMF 270). Also, depending on whether a coordinated multipoint (CoMP) (the dynamic coordination of transmission and/or reception between a UE and multiple geographically separated sites) is in effect or not, the flow of messages (i.e., who sends what messages to whom) that need to be exchanged can be different.

In an aspect, the following cases are identified:
1. UE-based multi-RTT positioning:
   1.A: A designated cell transmits measurements to the UE;
   Multiple designated cells transmit measurements for diversity gain;
   1.B: Multiple serving cells transmit their own measurements to the UE;
2. UE-assisted multi-RTT positioning with a serving cell as the LCS (LCS-BS):
   2.A: Non-LCS cells transmit measurements to the LCS-BS:
   The UE transmits measurements to the LCS BS, or to another serving cell, or to both for diversity gain;
3. UE-assisted multi-RTT positioning with the LCS outside of a serving cell:
   3.A: Non-designated cells transmit measurements to a designated cell, the designated cell forwards measurements to the LCS:
   The UE transmits measurements to the designated cell, or to another serving cell, or to both for diversity gain;
   3.B: Cells transmit measurements to the LCS:
   The UE transmits measurements to a primary serving cell, or to another serving cell, or to both for diversity gain.

In one or more aspects, techniques/processes are proposed to ensure that all of the RTT-related measurements are provided to the positioning entity (whether it be the UE, a serving cell, or an external LCS). To ease the descriptions thereof, the following RTT-related measurement quantities are defined for k=1, 2, 3:

$$\Delta_{UE}^k = T_{UE,Rx}^k - T_{UE,Tx}^k \quad (2)$$

$$\Delta_{gNB}^k = T_{gNB,Rx}^k - T_{gNB,Tx}^k \quad (3)$$

$$T_{adv}^k = \Delta_{UE}^k + \Delta_{gNB}^k \quad (4)$$

In equations (2), (3), and (4), k=1 corresponds to a primary serving cell (or simply "primary cell"), k=2 corresponds a secondary serving cell (or simply "secondary cell") in cases of CoMP communication transmissions, and k=3 corresponds to a neighboring cell in which the UE is not being served with data from that cell. Note that a base station, such as a gNB, is an example of a cell. Therefore, gNBs will be used as specific examples of cells in the description. But it should be noted that the aspects are applicable to cells in general.

The quantities $\Delta_{UE}^k$ are measured by the UE. Hence, these quantities are also referred to as UE RTT-related measurements. As expressed in equation (2), the UE RTT-related measurements are negative (since transmission of the UL reference signal (RS) occurs after the reception of the DL RS). In the UE-assisted cases, these UE RTT-related measurements should ultimately reach the LCS.

Above, it is indicated that $T_{UE,Rx}^k$, $T_{UE,Tx}^k$ measurements are respectively the UE received timing of the DL RS, and the UE transmit timing of the corresponding UL RS. However, in some alternative aspects, the UE may actually measure a received timing of a downlink radio subframe i (e.g., 1 millisecond (ms) in the time domain) from cell k defined by the first detected path in time to estimate the $T_{UE,Rx}^k$ measurement. Similarly, the UE may actually consider a transmit timing of an uplink radio subframe (e.g., 1 ms in the time domain) in which it did receive the DL transmission used for the $T_{UE,Rx}^k$ estimation to estimate the $T_{UE,Tx}^k$ quantities. Based on the timings of the radio subframes, the $T_{UE,Rx}^k$, $T_{UE,Tx}^k$ measurements may be derived/estimated. For example, knowledge of how DL RS and UL RS are configured within the subframe can be used to derive the $T_{UE,Rx}^k$, $T_{UE,Tx}^k$ measurements.

The quantities $\Delta_{gNB}^k$ are measured by the gNBs. Hence, these quantities are also referred to as cell RTT-related measurements. In the UE-based cases, these cell RTT-related measurements should ultimately reach the UE. In the UE-assisted cases in which the LCS is outside of the serving cell(s), these cell RTT-related measurements should ultimately reach the LCS. In the UE-assisted cases in which the LCS resides in a serving gNB, each gNB that is not the serving gNB should provide its cell RTT-related measurement to the serving gNB.

Above, it is indicated that $T_{gNB,Rx}^k$, $T_{gNB,Tx}^k$ measurements are respectively the gNB received timing of the UL RS, and the gNB transmit timing of the corresponding DL RS. However, in some alternative aspects, the cell k may actually measure a received timing of an uplink radio subframe i from the UE defined by the first detected path in time to estimate the $T_{gNB,Rx}^k$ measurement. Similarly, the cell k may actually measure a transmit timing of the downlink radio subframe i. Thus, the $\Delta_{gNB}^k$ quantity can represent a duration between a received time of the uplink subframe i from the UE and a transmit timing of the corresponding downlink subframe. Based on the timings of the radio subframes, the $T_{gNB,Rx}^k$, $T_{gNB,Tx}^k$ measurements may be derived/estimated. For example, knowledge of how DL RS and UL RS are configured within the subframe can be used to derive the $T_{gNB,Rx}^k$, $T_{gNB,Tx}^k$ measurements.

The quantities $T_{adv}^k$ are determined by the positioning entity based on the UE and the cell RTT-related measurements. Note that the quantity $T_{adv}^k$ is equal to the RTT between a gNB k and the UE. From the multiple RTTs and with the knowledge of the locations of the gNBs, the positioning entity (be it the UE, the serving gNB, or the external LCS) determines the position of the UE.

Figures 7A, 7B:
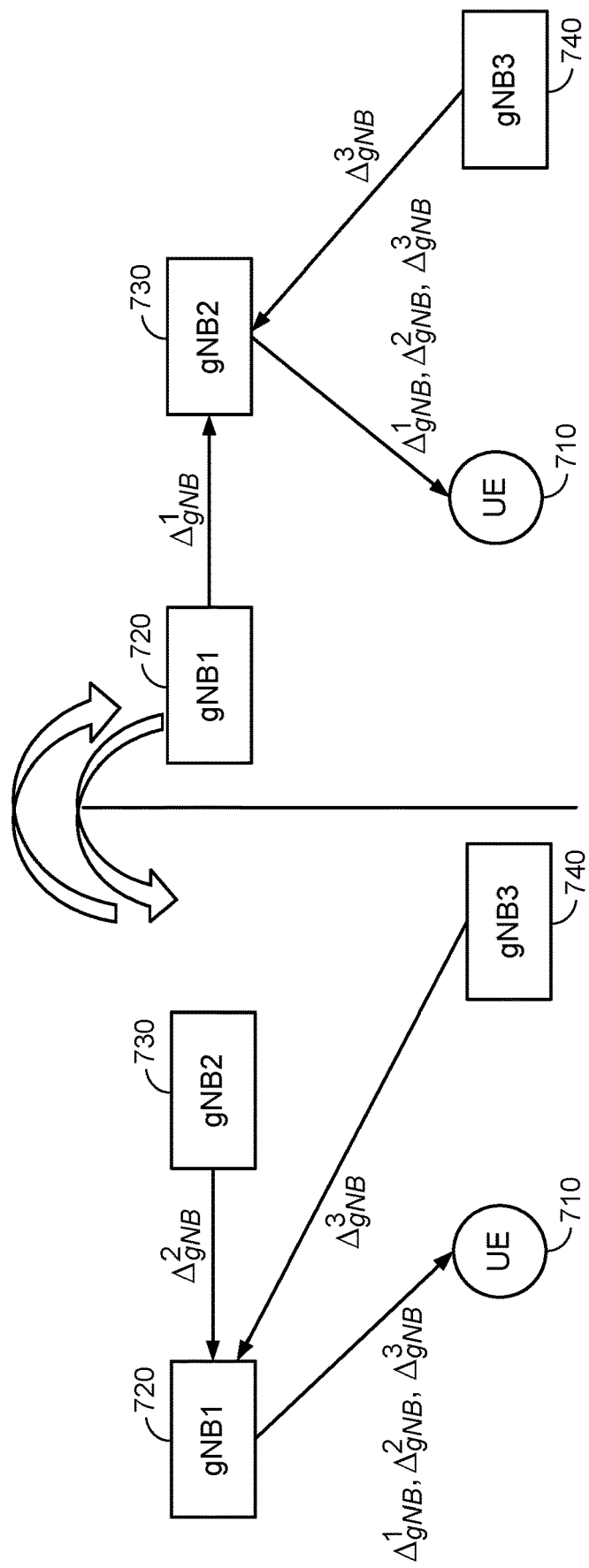
FIGS. 7A, 7B, and 7C illustrate example flows of RTT measurement messages for UE-based multi-RTT positioning in accordance with an aspect of the disclosure.
Figure 7C:
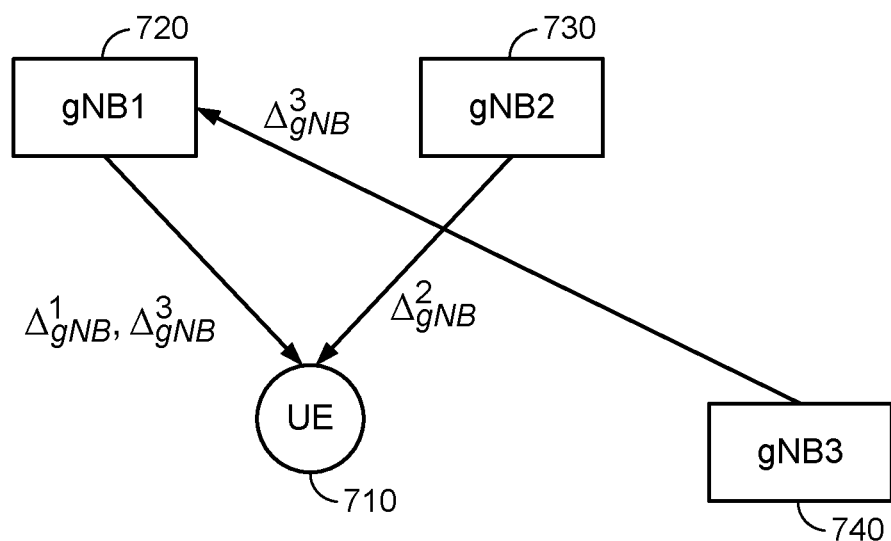

FIGS. 7A, 7B, and 7C illustrate example flows of RTT measurement messages for UE-based multi-RTT positioning among a UE 710 (e.g., any of the UEs described herein), a primary gNB 720 (k=1), a secondary gNB 730 (k=2), and a neighboring gNB 740 (k=3). While one secondary gNB 730 is shown in each of FIGS. 7A, 7B, and 7C, there can be any number, i.e., zero or more, of secondary gNBs 730. Also, while one neighboring gNB 740 is shown, there can be any number, i.e., zero or more, of neighboring gNBs 740. It is nonetheless assumed that there is a plurality of gNBs.

In these figures, the primary gNB 720 determines its quantity $\Delta_{gNB}^1$, each secondary gNB 730 determines its corresponding quantity $\Delta_{gNB}^2$, and each neighboring gNB 740 determines its corresponding quantity $\Delta_{gNB}^3$. The UE 710 determines the quantity $\Delta_{UE}^1$ associated with the primary gNB 720, determines the quantity $D_{UE}$ associated with each secondary gNB 730, and determines the quantity $\Delta_{UE}^3$ associated with each neighboring gNB 740.

In FIGS. 7A and 7B, a designated gNB transmits the necessary cell RTT-related measurements to the UE 710. The designated gNB can be any of the serving gNBs—the primary gNB 720 or any of the secondary gNBs 730. The designated gNB is the gNB that has a communication connection with the UE 710. In scenarios in which there is no non-coherent CoMP, the primary gNB 730 can be the designated gNB. On the other hand, in scenarios in which there is a non-coherent CoMP, a serving gNB (the primary gNB 720 or the secondary gNB 730) with the highest link quality can be chosen as the designated gNB. The link quality may be determined based on a CSF (channel state feedback) report and/or based on a RSRP and/or reference signal received quality (RSRQ) report.

The designated gNB gathers the measurements from other gNBs, and forwards them to the UE 710. In this specification, "gathering" is intended to indicate that the information (e.g., measurements) are generated directly by an entity (e.g., gNB, UE, location server) or are received from other entities. In FIG. 7A, the primary gNB 720 is assumed to be the designated gNB (e.g., non-coherent CoMP is not in effect or the primary gNB 720 has the highest link quality). All other gNBs send their measurement quantities to the primary gNB 720. That is, each secondary gNB 730 sends its $\Delta_{gNB}{}^2$ quantity to the primary gNB 720, and each neighboring gNB 740 sends its $\Delta_{gNB}{}^3$ quantity to the primary gNB 720. The primary gNB 720 sends its own $\Delta_{gNB}{}^1$ quantity along with the gathered $\Delta_{gNB}{}^2$, $\Delta_{gNB}{}^3$ quantities to the UE 710. For example, a physical downlink shared channel (PDSCH) and/or a physical downlink control channel (PDCCH) may be utilized to transmit the quantities to the UE 710.

In FIG. 7B, the secondary gNB 730 is assumed to be the designated gNB (e.g., non-coherent CoMP is in effect and the secondary gNB 730 has the highest link quality). All other gNBs send their measurement quantities to the secondary gNB 730. That is, the primary gNB 720 sends its $\Delta_{gNB}{}^1$ quantity to the designated secondary gNB 730, each of the other secondary gNBs 730 sends its $\Delta_{gNB}{}^2$ quantity to the designated secondary gNB 730, and each neighboring gNB 740 sends its $\Delta_{gNB}{}^3$ quantity to the designated secondary gNB 730. The designated secondary gNB 730 sends its own $\Delta_{gNB}{}^2$ quantity along with the gathered $\Delta_{gNB}{}^1$, $\Delta_{gNB}{}^2$, $\Delta_{gNB}{}^3$ quantities to the UE 710. Again, the PDSCH and/or PDCCH may be utilized to transmit the quantities to the UE 710.

In an aspect, the designated gNB can be switched dynamically. For example, in one instance, the primary gNB 720 can gather and send the measurement quantities to the UE 710 to determine its location. In the next instance of when the UE 710 determines its position, the secondary gNB 730 can gather and send the measurement quantities.

In FIGS. 7A and 7B, one designated gNB (the primary gNB 720 or the secondary gNB 730) is illustrated as sending the measurement quantities to the UE 710. However, while not specifically shown, multiple serving gNBs (any combination of the primary gNB 720 and/or the secondary gNBs 730 (recall that there can be any number of the secondary gNBs 730)) may send the gathered measurement quantities to the UE 710 for diversity gain.

In FIG. 7C, each serving gNB sends its RTT-related measurement directly to the UE 710. That is, the primary gNB 720 sends its $\Delta_{gNB}{}^1$ quantity to the UE 710, and each secondary gNB 730 sends its $\Delta_{gNB}{}^2$ quantity to the UE 710. However, since the neighboring gNB 740 is not in data communication with the UE 710, each neighboring gNB 740 sends its $\Delta_{gNB}{}^3$ quantity to a serving gNBs (the primary gNB 720 or the secondary gNB 730), which in turn forwards the received quantity to the UE 710. Yet again, the PDSCH and/or PDCCH may be utilized.

In FIGS. 7A, 7B, and 7C, since the UE 710 receives the cell RTT-related measurements (quantities $\Delta_{gNB}{}^1$, $\Delta_{gNB}{}^2$, $\Delta_{gNB}{}^3$) and is in possession of the UE RTT-related measurements (quantities $\Delta_{UE}{}^1$, $\Delta_{UE}{}^2$, $\Delta_{UE}{}^3$) through measurements, the UE 710 can determine the multiple RTTs. From the multiple RTTs, the UE 710 can determine its position. It is assumed that the UE 710 has knowledge of the locations of each of the gNBs 720, 730, 740 to enable the position of the UE 710 to be determined. The gNB locations may be provided to the UE 710 contemporaneously with the measurement quantities, provided by the network separately, and/or the UE 710 may have the locations stored within its memory storage.

Figures 8A, 8B:
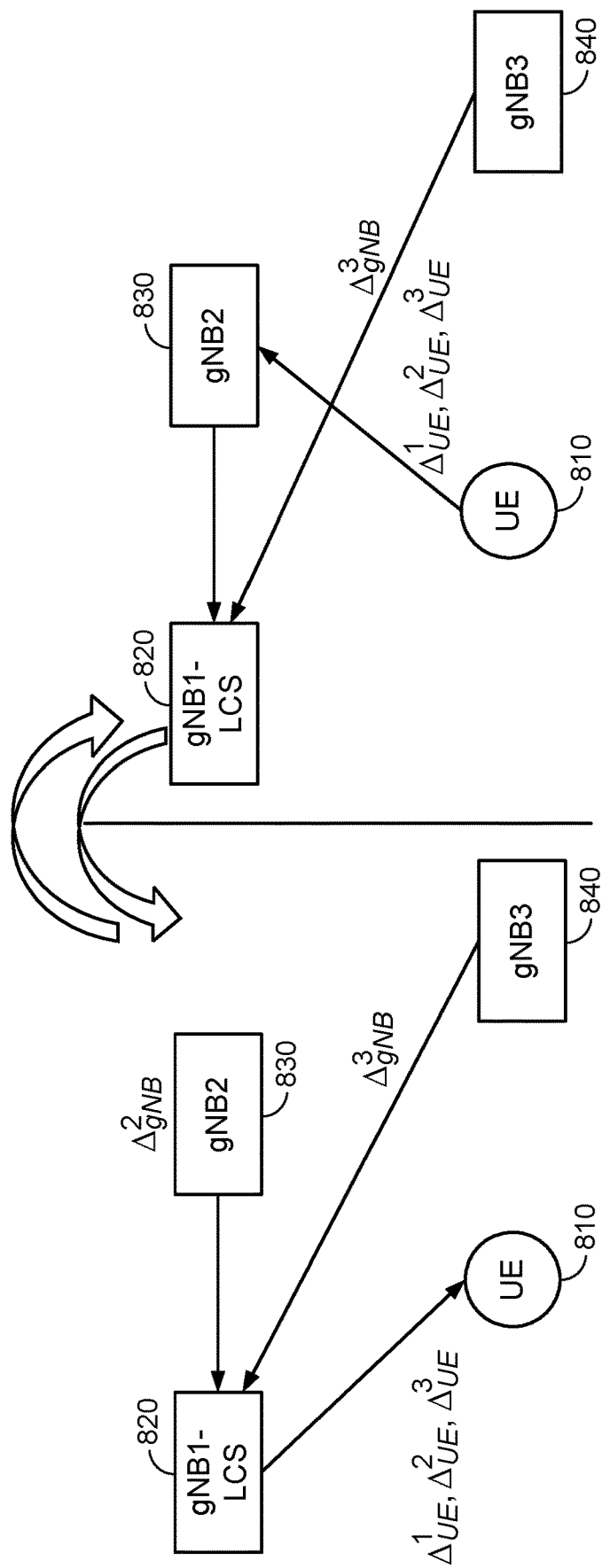
FIGS. 8A and 8B illustrate example flows of RTT measurement messages for UE-assisted multi-RTT positioning in which a location server (LCS) resides in a serving cell in accordance with an aspect of the disclosure.

FIGS. 8A and 8B illustrate example flows of RTT measurement messages for UE-assisted multi-RTT positioning among a UE 810 (e.g., any of the UEs described herein), a primary gNB 820 (k=1), a secondary gNB 830 (k=2), and a neighboring gNB 840 (k=3). While one secondary gNB 830 is shown in each of FIGS. 8A and 8B, there can be any number, i.e., zero or more, of secondary gNBs 830. Also, while one neighboring gNB 840 is shown, there can be any number, i.e., zero or more, of neighboring gNBs 840. It is nonetheless assumed that there is a plurality of gNBs. In FIGS. 8A and 8B, it is assumed that an LCS resides in the primary gNB 820. However, it should be noted that the LCS can reside in any serving gNB, e.g., in one of the secondary gNB 830.

The primary gNB 820 determines the quantity $\Delta_{gNB}{}^1$, each secondary gNB 830 determines its corresponding quantity $\Delta_{gNB}{}^2$, and each neighboring gNB 840 determines its corresponding quantity $\Delta_{gNB}{}^3$. The UE 810 determines the quantity $\Delta_{UE}{}^1$ associated with the primary gNB 820, determines the quantity $\Delta_{UE}{}^2$ associated with each secondary gNB 830, and determines the quantity $\Delta_{UE}{}^2$ associated with each neighboring gNB 840.

In FIGS. 8A and 8B, the primary gNB 820 gathers the cell RTT-related measurements from other gNBs and the UE RTT-related measurements from the UE 810. That is, each secondary gNB 830 sends its $\Delta_{gNB}{}^2$ quantity to the primary gNB 820, and each neighboring gNB 840 sends its $\Delta_{gNB}{}^3$ quantity to the primary gNB 820. In an aspect, the UE 810 can send the quantities $\Delta_{UE}{}^1$, $\Delta_{UE}{}^2$, $\Delta_{UE}{}^3$ to the primary gNB 820 (see FIG. 8A). For example, a physical uplink shared channel (PUSCH) and/or a physical uplink control channel (PUCCH) may be utilized to transmit the quantities to the primary gNB 820. Alternatively, the UE 810 can send the quantities $\Delta_{UE}{}^1$, $\Delta_{UE}{}^2$, $\Delta_{UE}{}^3$ to the secondary gNB 830 (see FIG. 8B), for example, in scenarios in which the non-coherent CoMP is in effect. The secondary gNB 830 in turn forwards the received quantities to the primary gNB 820. Again, the PUSCH and/or the PUCCH may be utilized to transmit to the secondary gNB 830.

In an aspect, the UE 810 can dynamically switch between sending the UE RTT-related measurements to the primary gNB 820 and sending them to the secondary gNB 830. For example, in one instance, the primary gNB 820 can receive the quantities directly from the UE 810 for determining the position of the UE 810. In the next instance, the primary gNB 820 can receive the quantities from the secondary gNB 830. While not shown, the UE 820 may transmit the quantities $\Delta_{UE}{}^1$, $\Delta_{UE}{}^2$, $\Delta_{UE}{}^3$ to multiple serving gNBs (any combination of the primary gNB 820 and/or the secondary gNBs 830) for diversity gain.

In FIGS. 8A and 8B, the primary gNB 820 is in possession of its cell RTT-related measurement (quantity $\Delta_{gNB}{}^1$) through measurements. The primary gNB 820 also receives the cell RTT-related measurements (quantities $\Delta_{gNB}{}^2$, $\Delta_{gNB}{}^3$) from other gNBs 830, 840 and receives the UE RTT-related measurements (quantities $\Delta_{UE}{}^1$, $\Delta_{UE}{}^2$, $\Delta_{UE}{}^3$) from the UE 810. The primary gNB 820 can therefore determine the multiple RTTs. Along with the knowledge of the locations of the gNBs 820, 830, 840, the primary gNB 820 can determine the position of the UE 810 from the multiple RTTs.

Figures 9A, 9B:
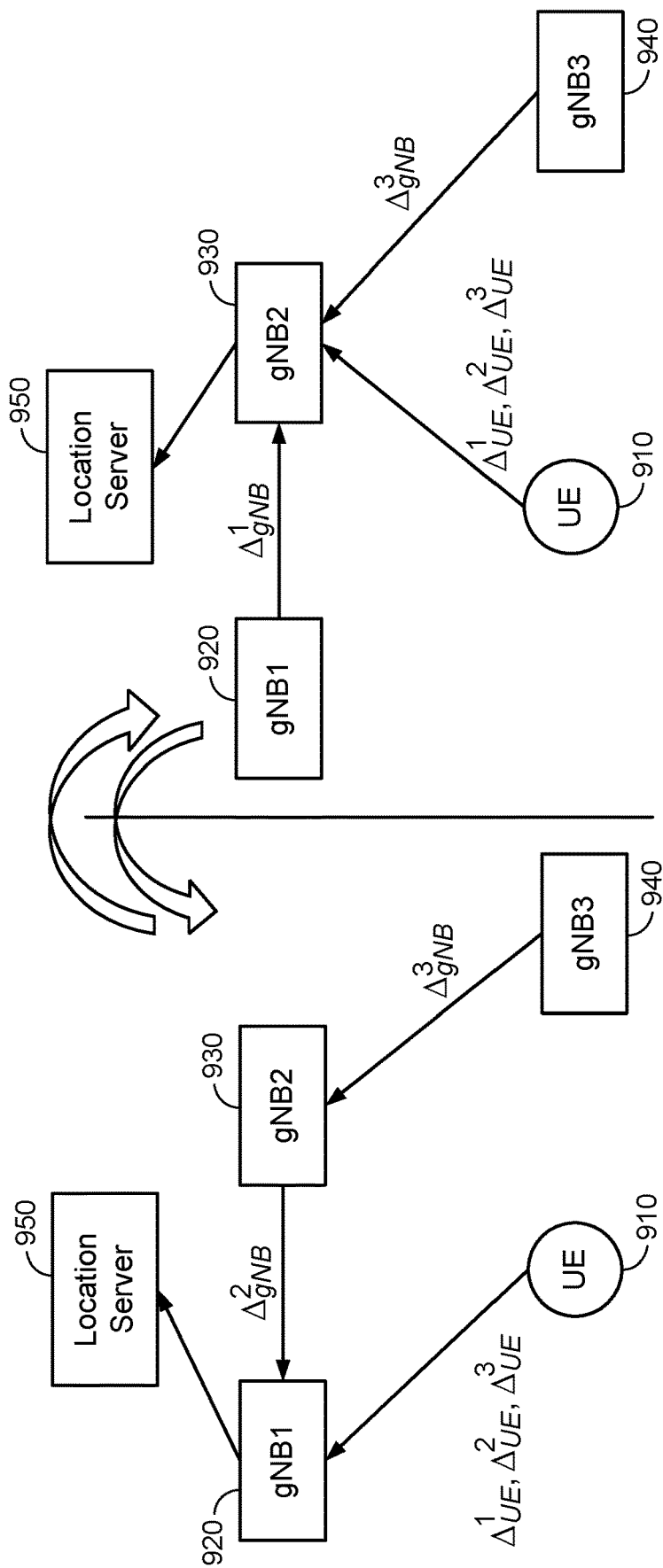
FIGS. 9A, 9B, 9C, and 9D illustrate example flows of RTT measurement messages for UE-assisted multi-RTT positioning in which an LCS is outside of serving cells in accordance with an aspect of the disclosure.

FIGS. 9A, 9B, 9C, and 9D illustrate example flows of RTT measurement messages for UE-assisted multi-RTT positioning among a UE 910 (e.g., any of the UEs described herein), a primary gNB 920 (k=1), a secondary gNB 930 (k=2), a neighboring gNB 940 (k=3), and an LCS 950 (e.g., location server 230, LMF 270). While one secondary gNB 930 is shown in each of FIGS. 9A and 9B, there can be any number, i.e., zero or more, of secondary gNBs 930. Also, while one neighboring gNB 940 is shown, there can be any number, i.e., zero or more, of neighboring gNBs 940. It is nonetheless assumed that there is a plurality of gNBs. In FIGS. 9A and 9B, it is assumed that the LCS 950 is external to any of the serving gNBs 920, 930.

The primary gNB 920 determines the quantity $\Delta_{gNB}^1$, each secondary gNB 930 determines its corresponding quantity $\Delta_{gNB}^2$, and each neighboring gNB 940 determines its corresponding quantity $\Delta_{gNB}^3$. The UE 910 determines the quantity $\Delta_{UE}^1$ associated with the primary gNB 920, determines the quantity $\Delta_{UE}^2$ associated with each secondary gNB 930, and determines the quantity $\Delta_{UE}^3$ associated with each neighboring gNB 940.

In FIGS. 9A and 9B, the UE 910 transmits the UE RTT-related measurements (quantities $\Delta_{UE}^1$, $\Delta_{UE}^2$, $\Delta_{UE}^3$) to a designated gNB. The designated gNB can be any of the serving gNBs the primary gNB 920 or the secondary gNBs 930. The designated gNB is the gNB that has a communication connection with the UE 910. In scenarios in which non-coherent CoMP is not in effect, the primary gNB 920 can be the designated gNB. On the other hand, in scenarios where non-coherent CoMP is in effect, a serving gNB (the primary gNB 920 or the secondary gNB 930) with the highest link quality can be chosen as the designated gNB. The link quality may be determined based on a channel state feedback (CSF) report and/or based on a RSRP/RSRQ report.

The designated gNB gathers the cell RTT-related measurements from other gNBs and forwards the gathered measurements to the LCS 950. In FIG. 9A, the primary gNB 920 is assumed to be the designated gNB (e.g., no non-coherent CoMP or the primary gNB 920 has the highest link quality). All other gNBs send their measurement quantities to the primary gNB 920. That is, each secondary gNB 930 sends its $\Delta_{gNB}^2$ quantity to the primary gNB 920. Also, each neighboring gNB 940 sends its $\Delta_{gNB}^3$ quantity to the primary gNB 920 or to the secondary gNB 930 to be forwarded to the primary gNB 920. The UE 910 sends the quantities $\Delta_{UE}^1$, $\Delta_{UE}^2$, $\Delta_{UE}^3$ to the primary gNB 920. For example, the PUSCH and/or the PUCCH may be utilized to transmit the quantities to the primary gNB 920. The primary gNB 920 sends its own $\Delta_{gNB}^1$ quantity along with the gathered $\Delta_{gNB}^2$, $\Delta_{gNB}^3$, $\Delta_{UE}^1$, $\Delta_{UE}^2$, $\Delta_{UE}^3$ to the LCS 950.

In FIG. 9B, the secondary gNB 930 is assumed to be the designated gNB (e.g., non-coherent CoMP and the secondary gNB 930 has the highest link quality). All other gNBs send their cell RTT-related measurements to the secondary gNB 930. That is, the primary gNB 920 sends its $\Delta_{gNB}^1$ quantity to the designated secondary gNB 930, each of the other secondary gNBs 930 sends its $\Delta_{gNB}^2$ quantity to the designated secondary gNB 930, and each neighboring gNB 940 sends its $\Delta_{gNB}^3$ quantity to the designated secondary gNB 930. The UE 910 sends the quantities $\Delta_{UE}^1$, $\Delta_{UE}^2$, $\Delta_{UE}^3$ to the designated secondary gNB 930. Again, the PUSCH and/or the PUCCH may be utilized. The primary gNB 920 sends its own $\Delta_{gNB}^1$ quantity along with the gathered $\Delta_{gNB}^2$, $\Delta_{gNB}^3$, $\Delta_{UE}^1$, $\Delta_{UE}^2$, $\Delta_{UE}^3$, quantities to the LCS 950. The designated secondary gNB 930 sends its own $\Delta_{gNB}^2$ quantity along with the gathered $\Delta_{gNB}^1$, $\Delta_{gNB}^2$, $\Delta_{gNB}^3$, $\Delta_{UE}^1$, $\Delta_{UE}^2$, $\Delta_{UE}^3$ quantities to the LCS 950.

In an aspect, the designated gNB can be switched dynamically. For example, in one instance, the primary gNB 920 can gather and send the measurement quantities to the LCS 950 to determine the position of the UE 910. In the next instance of when the position of the UE 910 is to be determined, the secondary gNB 930 can gather and send the measurement quantities to the LCS 950.

Figures 9C, 9D:
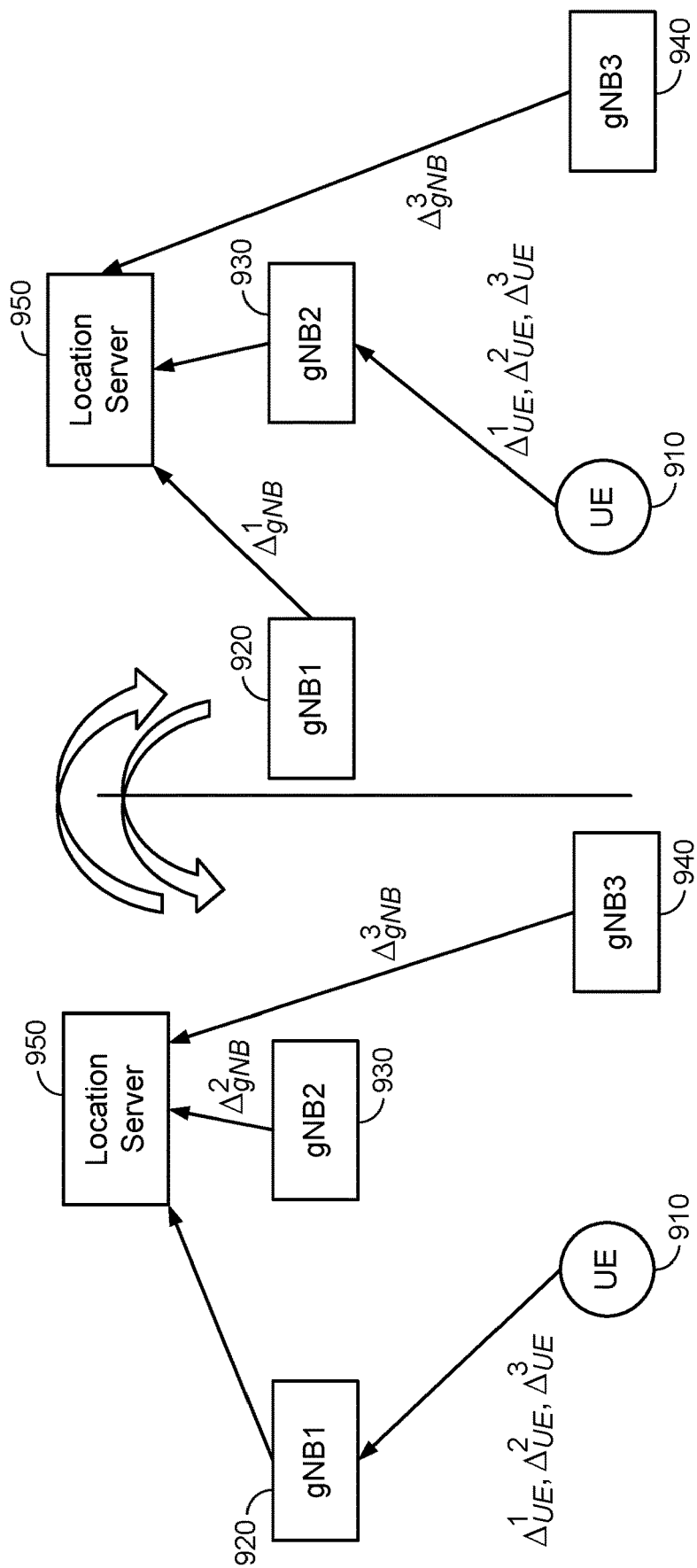

In FIGS. 9C and 9D, the UE 910 also transmits the quantities $\Delta_{UE}^1$, $\Delta_{UE}^2$, $\Delta_{UE}^3$ to a designated gNB. Again, the designated gNB can be any of the serving gNBs the primary gNB 920 or any of the secondary gNBs 930. When non-coherent CoMP is not in effect, the primary gNB 930 can be the designated gNB. But when non-coherent CoMP is in effect, a serving gNB (the primary gNB 920 or the secondary gNB 930) with the highest link quality can be chosen as the designated gNB. The link quality may be determined based on a CSF report and/or based on a RSRP/RSRQ report.

In FIGS. 9C and 9D, the measurement quantities gathering role of the designated gNB is reduced compared to that of the designated gNB of FIGS. 9A and 9B. This is because in FIGS. 9C and 9D, each gNB 920, 930, 940 sends its respective $\Delta_{gNB}^1$, $\Delta_{gNB}^2$, $\Delta_{gNB}^3$ quantity separately to the LCS 950. The designated gNB does, however, gather the quantities $\Delta_{UE}^1$, $\Delta_{UE}^2$, $\Delta_{UE}^3$ from the UE 910 and forwards them to the LCS 950. Again, the designated gNB can be switched dynamically.

In FIGS. 9A, 9B, 9C, and 9D, the LCS 950 receives the cell RTT-related measurements (quantities $\Delta_{gNB}^1$, $\Delta_{gNB}^2$, $\Delta_{gNB}^3$) from the gNBs 920, 930, 940 and receives the UE RTT-related measurements (quantities $\Delta_{UE}^1$, $\Delta_{UE}^2$, $\Delta_{UE}^3$) from the UE 910 via the designated gNB. The LCS 950 can therefore determine the multiple RTTs from the received RTT-related measurements. The LCS 950 can determine the position of the UE 910 from the multiple RTTs with the knowledge of the locations of the gNBs 920, 930, 940.

Figure 10:
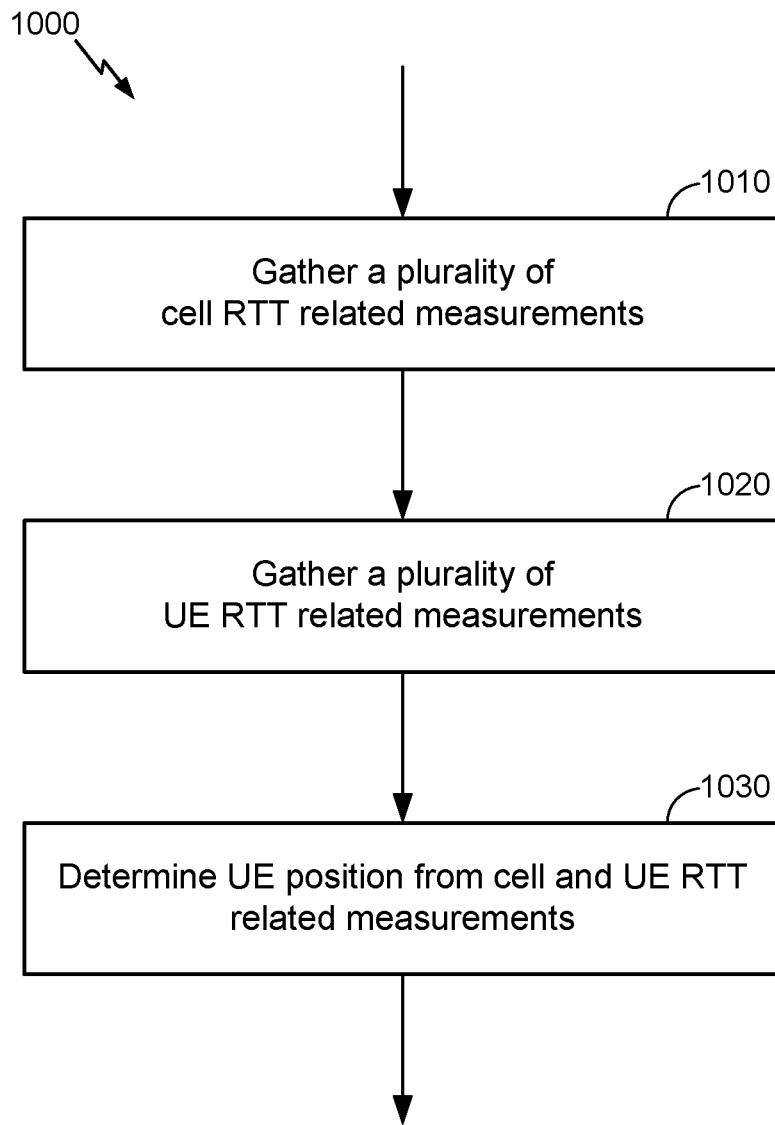
FIG. 10 illustrates an exemplary method performed by a positioning entity to determine a UE position in accordance with an aspect of the disclosure.

FIG. 10 illustrates an exemplary method 1000 performed by a positioning entity to determine the location of a UE (e.g., any of the UEs described herein). The positioning entity may be the UE itself, a serving cell (e.g., a serving gNB), or a location server external to the serving cell(s). At 1010, the positioning entity gathers a plurality of cell RTT-related measurements (e.g., quantities $\Delta_{gNB}^1$, $\Delta_{gNB}^2$, $\Delta_{gNB}^3$). At 1020, the positioning entity gathers a plurality of UE RTT-related measurements (e.g., quantities $\Delta_{UE}^1$, $\Delta_{UE}^2$, $\Delta_{UE}^3$). At 1030, the positioning entity determines the UE position based on the gathered cell and UE RTT-related measurements.

In an aspect, regarding the plurality of cell RTT-related measurements, there can be one $\Delta_{gNB}^1$ quantity, zero or more $\Delta_{gNB}^2$ quantities, and zero or more $\Delta_{gNB}^3$ quantities. However, there are multiple cell RTT-related measurements. That is, the total number of cell RTT-related measurements is two or greater. Preferably, there are at least three (when determining the UE position in two dimensions) or at least four (when determining the UE position in three dimensions). The $\Delta_{gNB}^1$ quantity corresponds to the primary cell (e.g., primary gNB 720, 820, 920), each $\Delta_{gNB}^2$ corresponds to each secondary cell (e.g., secondary gNB 730, 830, 930), and each $\Delta_{gNB}^3$ corresponds to each neighboring cell (e.g., neighboring gNB 740, 840, 940).

In another aspect, regarding the plurality of UE RTT-related measurements, there can be one $\Delta_{UE}^1$ quantity, zero or more $\Delta_{UE}^2$ quantities, and zero or more $\Delta_{UE}^3$ quantities. However, there are multiple UE RTT-related measurements.

That is, the total number of UE RTT-related measurements is two or greater. Preferably, there are at least three (to determine the UE position in two dimensions) or at least four (to determine the UE position in three dimensions). The $\Delta_{UE}^1$ quantity corresponds to the primary cell (e.g., primary gNB 720, 820, 920), each $\Delta_{UE}^2$ corresponds to each secondary cell (e.g., secondary gNB 730, 830, 930), and each $\Delta_{UE}^3$ corresponds to each neighboring cell (e.g., neighboring gNB 740, 840, 940).

In an aspect, the number of cell RTT-related measurements is equal to the number of UE RTT-related measurements. Moreover, each cell RTT-related measurement $\Delta_{gNB}^k$ corresponds to one UE RTT-related measurement $\Delta_{UE}^k$. For example, the quantity $\Delta_{gNB}^1$ corresponds to the quantity $\Delta_{UE}^1$. In this way, the RTT associated with the primary cell may be determined.

Figure 11:
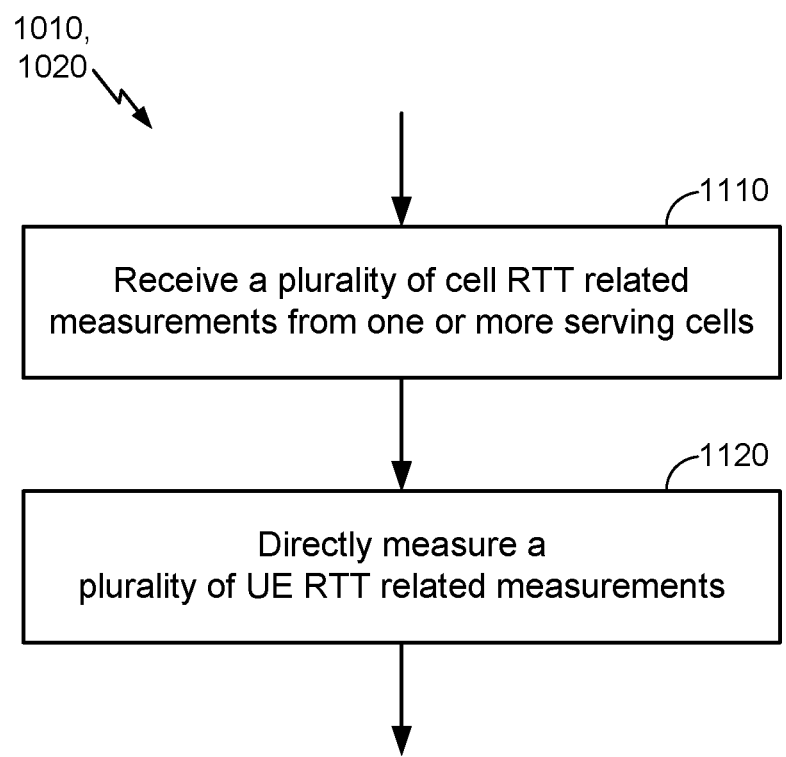
FIG. 11 illustrates an exemplary process performed by a UE when the UE is the positioning entity in accordance with an aspect of the disclosure.

FIG. 11 illustrates an exemplary process performed by a UE (e.g., any of the UEs described herein) to implement blocks 1010, 1020 of FIG. 10 when the positioning entity is the UE. In an aspect at 1110, the UE receives all of the cell RTT-related measurements (quantities $\Delta_{gNB}^1, \Delta_{gNB}^2, \Delta_{gNB}^3$) from a designated cell/TRP. This corresponds to the case 1.A identified above (see also FIGS. 7A, 7B). In this instance, the designated cell (e.g., primary gNB 720 or secondary gNB 730) gathers all of the cell RTT-related measurements and forwards them to the UE (e.g., UE 710).

The primary cell can be the designated cell when non-coherent CoMP is not in effect. On the other hand, when non-coherent CoMP is in effect, a serving cell (the primary cell or the secondary cell) with the highest link quality can be chosen as the designated cell. The link quality may be determined based on a CSF and/or a RSRP/RSRQ report.

In another aspect at 1110, the UE receives all of the cell RTT-related measurements from multiple serving cells (e.g., the primary gNB 720 and/or the secondary gNBs 730) for diversity gain. In yet another aspect at 1110, the UE receives the cell RTT-related measurements individually from each of the serving cells. This corresponds to the case 1.B identified above (see also FIG. 7C). That is, the UE receives $\Delta_{gNB}^1$ from the primary cell (e.g., primary gNB 720). When there are secondary cells (e.g., secondary gNBs 730), the UE receives $\Delta_{gNB}^2$ from each secondary cell. When there are neighboring cells (e.g., neighboring gNBs 740), the UE receives the corresponding $\Delta_{gNB}^3$ through one of the serving cells.

At 1120, the UE gathers the UE RTT-related measurements through directly measuring the arrival times of the DL RS and the transmission times of the UL RS. In other words, the UE directly measures the $T_{UE,Rx}^k$ and the corresponding $T_{UE,Tx}^k$.

Figure 12:
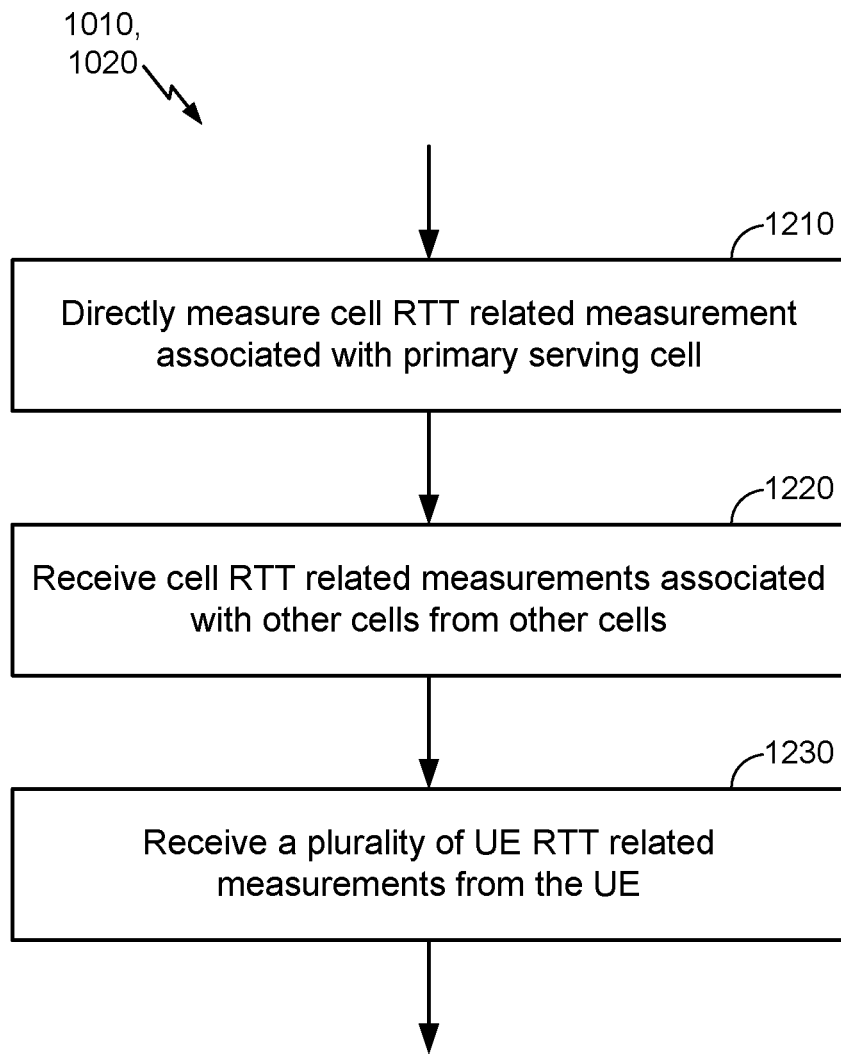
FIG. 12 illustrates an exemplary process performed by a serving cell when the serving cell is the positioning entity in accordance with an aspect of the disclosure.

FIG. 12 illustrates an exemplary process performed by a primary cell (e.g., primary gNB 820) to implement blocks 1010, 1020 of FIG. 10 when the primary cell is the positioning entity, i.e., when the location server resides in the primary cell. At 1210, the primary cell measures its own associated cell RTT-related measurement $\Delta_{gNB}^1$. That is, the primary cell directly measures the DL RS transmission time $T_{gNB,Tx}^1$ and the corresponding UL RS reception time $T_{gNB,Rx}^1$.

At 1220, the primary cell receives the cell RTT-related measurements $\Delta_{gNB}^2, \Delta_{gNB}^3$ associated with other cells. For example, when there are secondary cells (e.g., secondary gNBs 830), the primary cell receives the $\Delta_{gNB}^2$ quantities from the secondary cells. Also, when there are neighboring cells (e.g., secondary gNBs 840), the primary cell receives the $\Delta_{gNB}^3$ quantities from the neighboring cells. This corresponds to the case 2.A identified above (see also FIGS. 8A, 8B).

At 1230, the primary cell receives the UE RTT-related measurements $\Delta_{UE}^1, \Delta_{UE}^2, \Delta_{UE}^3$ from the UE (e.g., UE 810). Alternatively, the primary cell receives the UE RTT-related measurements $\Delta_{UE}^1, \Delta_{UE}^2, \Delta_{UE}^3$ from one of the secondary cells. In this instance, the UE has sent the UE RTT-related measurements $\Delta_{UE}^1, \Delta_{UE}^2, \Delta_{UE}^3$ to the secondary cell selected as having the highest link quality in scenarios when non-coherent CoMP is in effect, and the secondary cell is forwarding the received measurements to the primary cell.

In yet another alternative, the primary cell receives the UE RTT-related measurements $\Delta_{UE}^1, \Delta_{UE}^2, \Delta_{UE}^3$ from the UE and from the secondary cell. In this instance, the UE may send the measurements to both the primary and the secondary cells for diversity gain.

Figure 13:
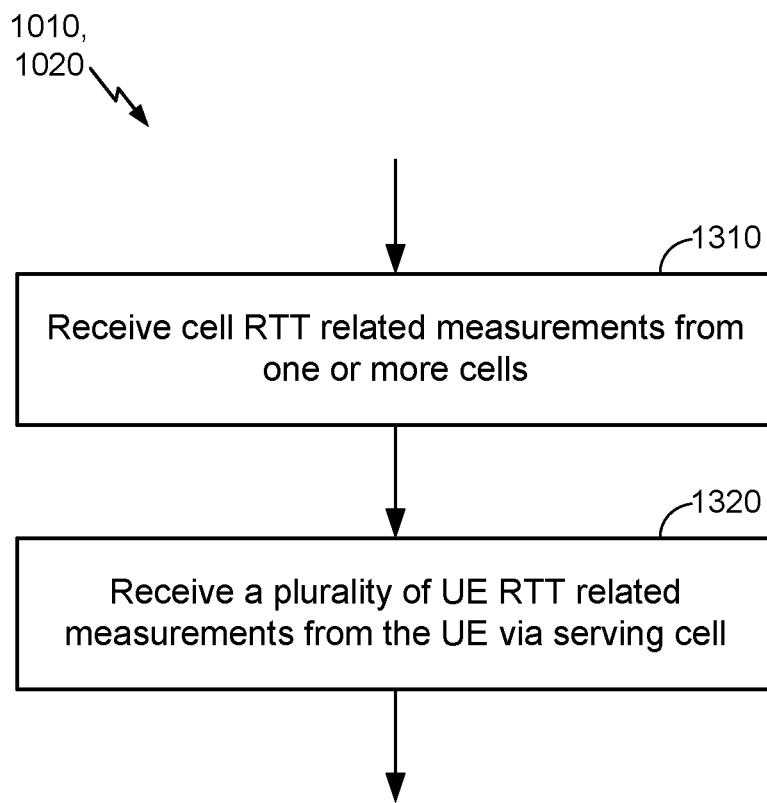
FIG. 13 illustrates an exemplary process performed by the positioning entity when the positioning entity is separate from the serving cells in accordance with an aspect of the disclosure.

FIG. 13 illustrates an exemplary process performed by the positioning entity to implement blocks 1010, 1020 when the positioning entity is separate, i.e., when the location server is outside of the serving cells. At 1310, the positioning entity (e.g., the LCS 950) receives all of the plurality of cell RTT-related measurements (quantities $\Delta_{gNB}^1, \Delta_{gNB}^2, \Delta_{gNB}^3$) from a designated cell. This corresponds to the case 3.A identified above (see also FIGS. 9A, 9B). In this instance, the designated cell (e.g., primary gNB 920 or the secondary gNB 930) gathers all of the cell RTT-related measurements and forwards them to the positioning entity.

The primary cell can be the designated cell when non-coherent CoMP is not in effect. On the other hand, when non-coherent CoMP is in effect, a serving cell (the primary cell or the secondary cell) with the highest link quality can be chosen as the designated cell. The link quality may be determined based on a CSF and/or a RSRP/RSRQ report.

Alternatively, the positioning entity (e.g., the LCS 950) receives the cell RTT-related measurements individually from each of the primary, secondary, and neighboring cells. This corresponds to the case 3.B identified above (see also FIGS. 9C and 9D). That is, the positioning entity (e.g., the LCS 950) receives $\Delta_{gNB}^1$ from the primary cell (e.g., primary gNB 920), receives $\Delta_{gNB}^2$ from each secondary cell (e.g., secondary gNB 930) when there are secondary cells, and receives $\Delta_{gNB}^3$ from each neighboring cell (e.g., neighboring gNB 940) when there are neighboring cells.

At 1320, the positioning entity (e.g., the LCS 950) receives the plurality of UE RTT-related measurements (quantities $\Delta_{UE}^1, \Delta_{UE}^2, \Delta_{UE}^3$) forwarded from the designated cell. Alternatively, the positioning entity (e.g., the LCS 950) receives the plurality of UE RTT-related measurements from the designated cell, and receives the same plurality of UE RTT-related measurements from another serving cell. This can be due to the UE sending the same of UE RTT-related measurements to multiple serving cells for diversity gain.

In the foregoing, the term "cell" has been used when describing the techniques disclosed herein. However, as will be appreciated, the term "cell" may be replaced with the term "TRP," as a cell generally corresponds to a TRP and vice versa.

Figure 14:
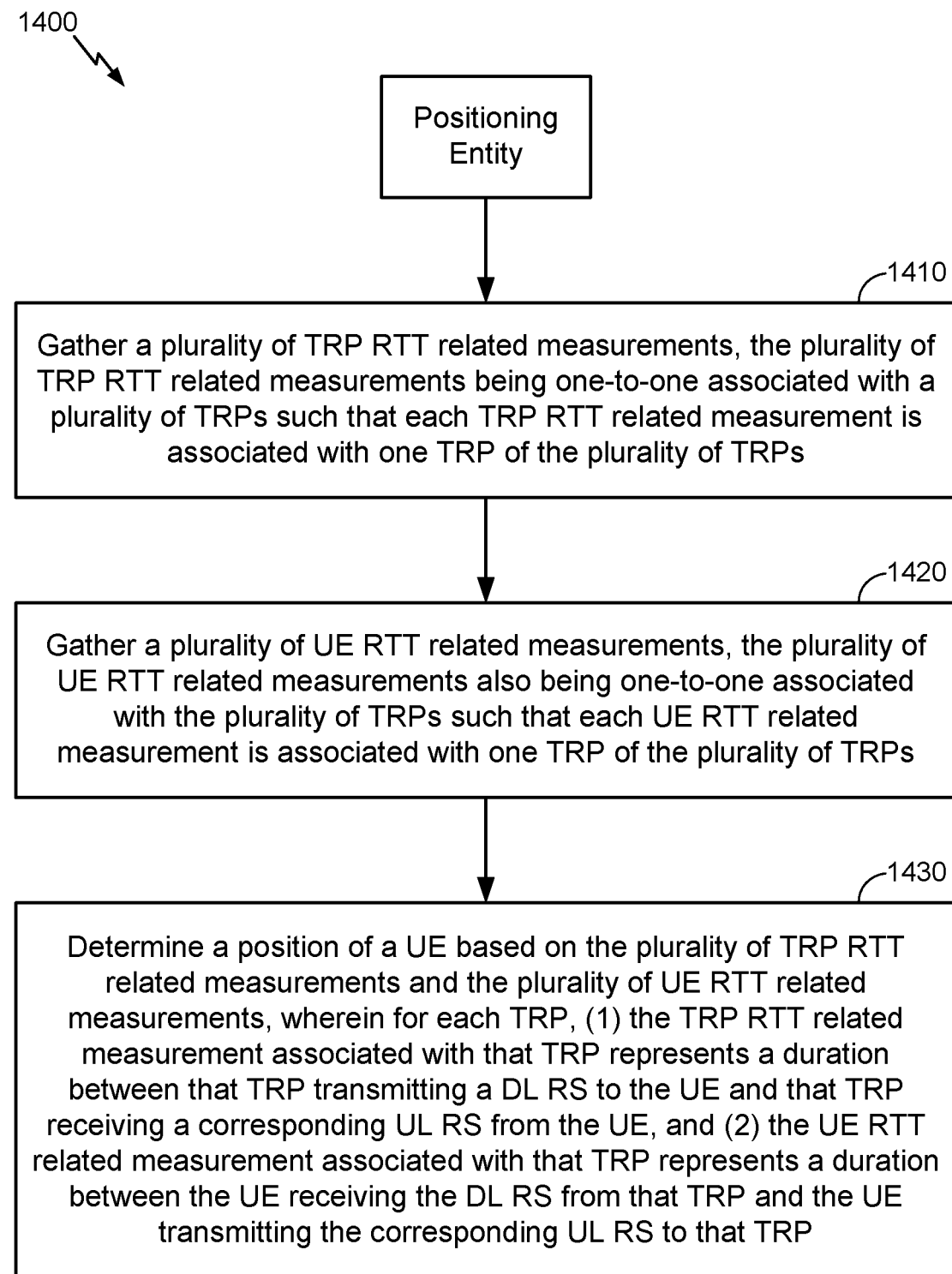
FIG. 14 illustrates a method in accordance with various aspects disclosed herein.

FIG. 14 illustrates an exemplary method 1400 in accordance with various aspects of the disclosure. The method 1400 may be performed by a positioning entity, such as a UE, a serving gNB, or a location server. The method 1400 generally corresponds to the method 1000 of FIG. 10.

At 1410, the positioning entity gathers a plurality of TRP RTT-related measurements, the plurality of TRP RTT-related measurements being one-to-one associated with a plurality of TRPs, wherein each TRP RTT-related measurement is associated with one TRP of the plurality of TRPs. In an aspect, where the positioning entity is in a UE, operation 1410 may be performed by WWAN transceiver 310, processing system 332, memory 340, and/or RTT measurement component 342, any or all of which may be considered means for performing this operation. In an aspect, where the positioning entity is in a gNB, operation 1410 may be performed by WWAN transceiver 350, processing system 384, memory 386, and/or RTT measurement component 388, any or all of which may be considered means for performing this operation. In an aspect, where the positioning entity is in a network entity, operation 1410 may be performed by network interface(s) 390, processing system 394, memory 396, and/or RTT measurement component 398, any or all of which may be considered means for performing this operation.

At 1420, the positioning entity gathers a plurality of UE RTT-related measurements, wherein each of the plurality of UE RTT-related measurements is associated with one TRP of the plurality of TRPs. In an aspect, where the positioning entity is in a UE, operation 1420 may be performed by WWAN transceiver 310, processing system 332, memory 340, and/or RTT measurement component 342, any or all of which may be considered means for performing this operation. In an aspect, where the positioning entity is in a gNB, operation 1420 may be performed by WWAN transceiver 350, processing system 384, memory 386, and/or RTT measurement component 388, any or all of which may be considered means for performing this operation. In an aspect, where the positioning entity is in a network entity, operation 1420 may be performed by network interface(s) 390, processing system 394, memory 396, and/or RTT measurement component 398, any or all of which may be considered means for performing this operation.

At 1430, the positioning entity determines a position of a UE based on the plurality of TRP RTT-related measurements and the plurality of UE RTT-related measurements. In an aspect, for each TRP of the plurality of TRPs, the TRP RTT-related measurement associated with that TRP represents a duration between that TRP transmitting a DL RS to the UE and that TRP receiving a corresponding UL RS from the UE, and the UE RTT-related measurement associated with that TRP represents a duration between the UE receiving the DL RS from that TRP and the UE transmitting the corresponding UL RS to that TRP. In an aspect, where the positioning entity is in a UE, operation 1430 may be performed by processing system 332, memory 340, and/or RTT measurement component 342, any or all of which may be considered means for performing this operation. In an aspect, where the positioning entity is in a gNB, operation 1430 may be performed by processing system 384, memory 386, and/or RTT measurement component 388, any or all of which may be considered means for performing this operation. In an aspect, where the positioning entity is in a network entity, operation 1430 may be performed by processing system 394, memory 396, and/or RTT measurement component 398, any or all of which may be considered means for performing this operation.

Figure 15:
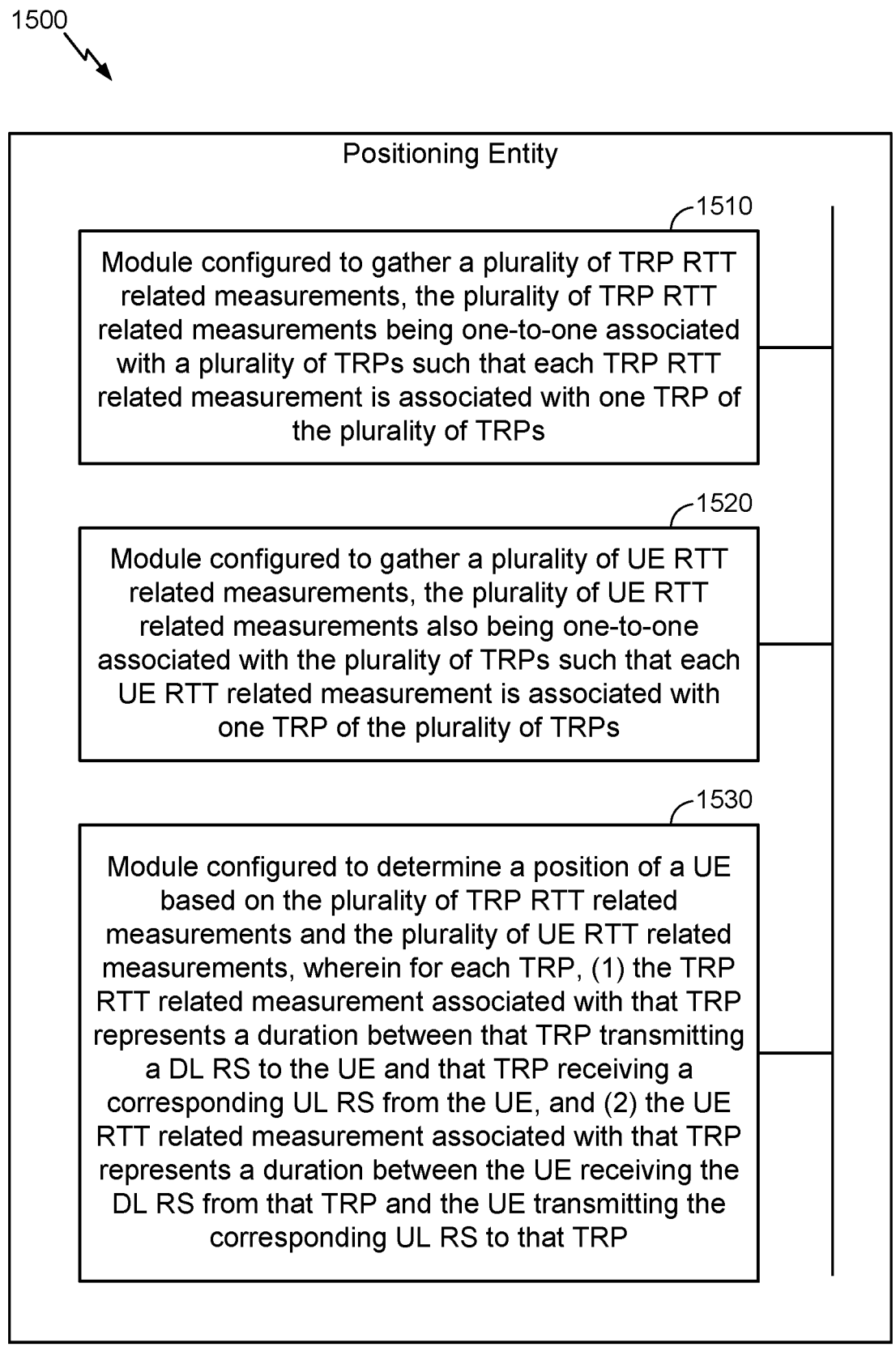
FIG. 15 illustrates an exemplary positioning entity 1500, according to aspects of the disclosure.

FIG. 15 illustrates an exemplary positioning entity 1500, according to aspects of the disclosure. The positioning entity may correspond to a UE (e.g., UE 302), a base station (e.g., base station 304), or a network entity (e.g., network entity 306).

The positioning entity 1500 includes a module 1510 configured to gather a plurality of TRP RTT-related measurements, the plurality of TRP RTT-related measurements being one-to-one associated with a plurality of TRPs, wherein each TRP RTT-related measurement is associated with one TRP of the plurality of TRPs. In an aspect, where the positioning entity 1500 is in a UE, module 1510 may correspond to WWAN transceiver 310, processing system 332, memory 340, and/or RTT measurement component 342. In an aspect, where the positioning entity 1500 is in a gNB, module 1510 may correspond to WWAN transceiver 350, network interface(s) 380, processing system 384, memory 386, and/or RTT measurement component 388. In an aspect, where the positioning entity 1500 is in a network entity, module 1510 may correspond to network interface(s) 390, processing system 394, memory 396, and/or RTT measurement component 398.

The positioning entity 1500 includes a module 1520 configured to gather a plurality of UE RTT-related measurements, wherein each of the plurality of UE RTT-related measurements is associated with one TRP of the plurality of TRPs. In an aspect, where the positioning entity 1500 is in a UE, module 1520 may correspond to WWAN transceiver 310, processing system 332, memory 340, and/or RTT measurement component 342. In an aspect, where the positioning entity 1500 is in a gNB, module 1520 may correspond to WWAN transceiver 350, network interface(s) 380, processing system 384, memory 386, and/or RTT measurement component 388. In an aspect, where the positioning entity 1500 is in a network entity, module 1520 may correspond to network interface(s) 390, processing system 394, memory 396, and/or RTT measurement component 398.

The positioning entity 1500 includes a module 1530 configured to determine a position of a UE based on the plurality of TRP RTT-related measurements and the plurality of UE RTT-related measurements, wherein for each TRP of the plurality of TRPs, the TRP RTT-related measurement associated with that TRP represents a duration between that TRP transmitting a downlink reference signal (DL RS) to the UE and that TRP receiving a corresponding uplink reference signal (UL RS) from the UE, and the UE RTT-related measurement associated with that TRP represents a duration between the UE receiving the DL RS from that TRP and the UE transmitting the corresponding UL RS to that TRP. In an aspect, where the positioning entity 1500 is in a UE, module 1530 may correspond to WWAN transceiver 310, processing system 332, memory 340, and/or RTT measurement component 342. In an aspect, where the positioning entity 1500 is in a gNB, module 1530 may correspond to WWAN transceiver 350, network interface(s) 380, processing system 384, memory 386, and/or RTT measurement component 388. In an aspect, where the positioning entity 1500 is in a network entity, module 1530 may correspond to network interface(s) 390, processing system 394, memory 396, and/or RTT measurement component 398.

In an aspect, the DL RS may be a PRS and/or the UL RS may be an SRS.

In an aspect, for each TRP k, the associated TRP RTT-related measurement is expressed as $\Delta_{gNB}^{k}=T_{gNB,Rx}^{k}-T_{gNB,Tx}^{k}$ in which $T_{gNB,Tx}^{k}$ represents a transmission time of the DL RS from that TRP and $T_{gNB,Rx}^{k}$ represents a reception time of the corresponding UL RS at that TRP, and the associated UE RTT-related measurement is expressed as $\Delta_{gNB}^{k}=T_{gNB,Rx}^{k}-T_{gNB,Tx}^{k}$ in which $T_{UE,Rx}^{k}$ represents a reception time of the DL RS at the UE and $T_{gNB,Tx}^{k}$ represents a transmission time of the corresponding UL RS from the UE, wherein the plurality of TRP RTT-related measurements comprise quantities one $\Delta_{gNB}^{1}$, zero or more $\Delta_{gNB}^2$, and zero or more $\Delta_{gNB}^3$ such that a total number of TRP RTT-related measurements is two or greater, the $\Delta_{gNB}^1$ corresponding to a primary TRP in data communication with the UE, each $\Delta_{gNB}^2$ corresponding to each secondary TRP in data communication with the UE, and each $\Delta_{gNB}^3$ corresponding to a neighboring TRP not in data communication with the UE, and wherein the plurality of UE RTT-related measurements comprise quantities one $\Delta_{UE}^1$, zero or more $\Delta_{UE}^2$, and zero or more $\Delta_{UE}^3$ such that a total number of UE RTT-related measurements is two or greater, the $\Delta_{UE}^1$ corresponding to the primary TRP, each $\Delta_{UE}^2$ corresponding to each secondary TRP, and each $\Delta_{UE}^3$ corresponding to each neighboring TRP.

In an aspect, for at least one TRP k, the $T_{UE,Rx}^k$, $T_{UE,Tx}^k$ measurements are derived from a received timing at the UE of a downlink radio subframe i from the TRP k defined by a first detected path in time, and a transmit timing at the UE of an uplink radio subframe i corresponding to the downlink radio subframe i, and/or the $T_{gNB,Rx}^k$, $T_{gNB,Tx}^k$ measurements are derived from a received timing at the TRP k of the uplink radio subframe i defined by a first detected path in time, and a transmit timing at the TRP k of the downlink radio subframe.

In an aspect, if the UE is the positioning entity, the module 1510 being configured to gather the plurality of TRP RTT-related measurements may comprise the module 1510 being configured to receive all of the plurality of TRP RTT-related measurements $\Delta_{gNB}^1$, $\Delta_{gNB}^2$, $\Delta_{gNB}^3$ from a designated TRP, the designated TRP being the primary TRP or a secondary TRP. In an aspect, the designated TRP may be the primary TRP when a non-coherent CoMP is not in effect, and the designated TRP may be a serving TRP among the primary and secondary TRPs with a highest link quality when the non-coherent CoMP is in effect.

In an aspect, if the UE is the positioning entity, the module 1510 being configured to gather the plurality of TRP RTT-related measurements may include the module 1510 being configured to receive individually the TRP RTT-related measurement $\Delta_{gNB}^1$, $\Delta_{gNB}^2$ from each of the primary TRP and secondary TRPs. In an aspect, the module 1510 being configured to gather the plurality of TRP RTT-related measurements may further include the module 1510 being configured to receive the TRP RTT-related measurements $\Delta_{gNB}^3$ of the neighboring TRP through the primary TRP or the secondary TRP.

In an aspect, if the UE is the positioning entity, the module 1510 being configured to gather the plurality of TRP RTT-related measurements $\Delta_{gNB}^1$, $\Delta_{gNB}^2$, $\Delta_{gNB}^3$ may include the module 1510 being configured to receive all of the plurality of TRP RTT-related measurements $\Delta_{gNB}^1$, $\Delta_{gNB}^2$, $\Delta_{gNB}^3$ from the primary TRP, or to receive all of the plurality of TRP RTT-related measurements $\Delta_{gNB}^1$, $\Delta_{gNB}^2$, $\Delta gNB^3$ from a secondary TRP.

In an aspect, if the UE is the positioning entity, the module 1520 being configured to gather the plurality of UE RTT-related measurements $\Delta_{UE}^1$, $\Delta_{UE}^2$, $\Delta_{UE}^3$ may include the module 1520 being configured to determine the UE RTT-related measurements $\Delta_{UE}^1$, $\Delta_{UE}^2$, $\Delta_{UE}^3$ through direct measurements of the DL RS arrival times and the UL RS transmission times.

In an aspect, if the primary TRP is the positioning entity, the module 1510 being configured to gather the plurality of TRP RTT-related measurements may include the module 1510 being configured to determine the TRP RTT-related measurement $\Delta_{gNB}^1$ through direct measurements of the transmission time of the DL RS transmitted from the primary TRP and the reception time of the corresponding UL RS received from the UE, and to receive the TRP RTT-related measurement $\Delta_{gNB}^2$, $\Delta_{gNB}^3$ from each secondary TRP and from each neighboring TRP.

In an aspect, if the primary TRP is the positioning entity, the module 1520 being configured to gather the plurality of UE RTT-related measurements $\Delta_{UE}^1$, $\Delta_{UE}^2$, $\Delta_{UE}^3$ may include the module 1520 being configured to receive the plurality of UE RTT-related measurements $\Delta_{UE}^1$, $\Delta_{UE}^2$, $\Delta_{UE}^3$ from the UE.

In an aspect, if the primary TRP is the positioning entity, the module 1520 being configured to gather the plurality of UE RTT-related measurements $\Delta_{UE}^1$, $\Delta_{UE}^2$, $\Delta_{UE}^3$ may include the module 1520 being configured to receive the plurality of UE RTT-related measurements $\Delta_{UE}^1$, $\Delta_{UE}^2$, $\Delta_{UE}^3$ from the secondary TRP. In an aspect, a non-coherent CoMP may be in effect, and the secondary TRP may be determined to have a higher link quality to the UE than the primary TRP.

In an aspect, if the primary TRP is the positioning entity, the module 1520 being configured to gather the plurality of UE RTT-related measurements $\Delta_{UE}^1$, $\Delta_{UE}^2$, $\Delta_{UE}^3$ may include the module 1520 being configured to receive the plurality of UE RTT-related measurements $\Delta_{UE}^1$, $\Delta_{UE}^2$, $\Delta_{UE}^3$ from the UE, or to receive the plurality of UE RTT-related measurements $\Delta_{UE}^1$, $\Delta_{UE}^2$, $\Delta_{UE}^3$ from the secondary TRP.

In an aspect, the positioning entity may be outside of any of the primary and secondary TRPs and outside of the UE. In that case, the module 1510 being configured to gather the plurality of TRP RTT-related measurements may include the module 1510 being configured to receive all of the plurality of TRP RTT-related measurements $\Delta_{gNB}^1$, $\Delta_{gNB}^2$, $\Delta_{gNB}^3$ from a designated TRP, the designated TRP being the primary TRP or a secondary TRP. The designated TRP may be the primary TRP when no non-coherent CoMP is in effect, and the designated TRP may be a serving TRP among the primary and secondary TRPs with a highest link quality when the non-coherent CoMP is in effect. In an aspect, the module 1510 being configured to gather the plurality of TRP RTT-related measurements may include the module 1510 being configured to receive individually the TRP RTT-related measurement $\Delta_{gNB}^1$, $\Delta_{gNB}^2$, $A_{gNB}^3$ from each of the primary TRP, the secondary TRPs, and the neighboring TRPs. In an aspect, the module 1520 being configured to gather the plurality of UE RTT-related measurements $\Delta_{UE}^1$, $\Delta_{UE}^2$, $\Delta_{UE}^3$ may include the module 1520 being configured to receive all of the plurality of UE RTT-related measurements $\Delta_{UE}^1$, $\Delta_{UE}^2$, $\Delta_{UE}^3$ from a designated TRP, the designated TRP being the primary TRP or one of the secondary TRP. The designated TRP may be the primary TRP when no non-coherent CoMP is in effect, and the designated TRP may be a serving TRP among the primary and secondary TRPs with a highest link quality when the non-coherent CoMP is in effect. In an aspect, the module 1520 being configured to gather the plurality of UE RTT-related measurements $\Delta_{UE}^1$, $\Delta_{UE}^2$, $\Delta_{UE}^3$ may include the module 1520 being configured to receive all of the plurality of UE RTT-related measurements $\Delta_{UE}^1$, $\Delta_{UE}^2$, $\Delta_{UE}^3$ from the primary TRP, or to receive all of the plurality of UE RTT-related measurements $\Delta_{UE}^1$, $\Delta_{UE}^2$, $\Delta_{UE}^3$ from the secondary TRP.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a positioning entity, comprising:
obtaining a plurality of transmission-reception point (TRP) round trip time (RTT) related measurements, the plurality of TRP RTT-related measurements being one-to-one associated with a plurality of TRPs, wherein each TRP RTT-related measurement is associated with one TRP of the plurality of TRPs;
receiving a plurality of user equipment (UE) RTT-related measurements via a primary TRP in data communication with the UE, wherein each of the plurality of UE RTT-related measurements is associated with one TRP of the plurality of TRPs; and
determining a position of a UE based on the plurality of TRP RTT-related measurements and the plurality of UE RTT-related measurements,
wherein:
a TRP RTT-related measurement associated with each TRP of the plurality of TRPs represents a duration between that TRP transmitting a downlink reference signal (DL RS) to the UE and that TRP receiving a corresponding uplink reference signal (UL RS) from the UE, and
a UE RTT-related measurement associated with each TRP of the plurality of TRPs represents a duration between the UE receiving the DL RS from that TRP and the UE transmitting the corresponding UL RS to that TRP,
wherein for each TRP k,
the associated TRP RTT-related measurement is expressed as $\Delta_{gNB}^k = T_{gNB,Rx}^k - T_{gNB,Tx}^k$ in which $T_{gNB,Tx}^k$ represents a transmission time of the DL RS from that TRP and $T_{gNB,Rx}^k$ represents a reception time of the corresponding UL RS at that TRP, and
the associated UE RTT-related measurement is expressed as $\Delta_{UE}^k = T_{UE,Rx}^k - T_{UE,Tx}^k$ in which $T_{UE,Rx}^k$ represents a reception time of the DL RS at the UE and $T_{UE,Tx}^k$ represents a transmission time of the corresponding UL RS from the UE,
wherein the plurality of TRP RTT-related measurements comprise quantities one $\Delta_{gNB}^1$, zero or more $\Delta_{gNB}^2$, and zero or more $\Delta_{gNB}^3$ such that a total number of TRP RTT-related measurements is two or greater, the $\Delta_{gNB}^1$ corresponding to a primary TRP, each $\Delta_{gNB}^2$ corresponding to each secondary TRP in data communication with the UE, and each $\Delta_{gNB}^3$ corresponding to a neighboring TRP not in data communication with the UE, and wherein the plurality of UE RTT-related measurements comprise quantities one $\Delta_{UE}^1$, zero or more $\Delta_{UE}^2$, and zero or more $\Delta_{UE}^3$ such that a total number of UE RTT-related measurements is two or greater, the $\Delta_{UE}^1$ corresponding to the primary TRP, each $\Delta_{UE}^2$ corresponding to each secondary TRP, and each $\Delta_{UE}^3$ corresponding to each neighboring TRP.

2. The method of claim 1, wherein the DL RS is a positioning reference signal (PRS) and/or the UL RS is a sounding reference signal (SRS).

3. The method of claim 1, wherein for at least one TRP k, the $T_{UE,Rx}^k$, $T_{UE,Tx}^k$ measurements are derived from a received timing at the UE of a downlink radio subframe i from the TRP k defined by a first detected path in time, and a transmit timing at the UE of an uplink radio subframe i corresponding to the downlink radio subframe i, and/or the $T_{gNB,Rx}^k$, $T_{gNB,Tx}^k$ measurements are derived from a received timing at the TRP k of the uplink radio subframe i defined by a first detected path in time, and a transmit timing at the TRP k of the downlink radio subframe.

4. The method of claim 1, wherein the primary TRP is the positioning entity.

5. The method of claim 4, wherein obtaining the plurality of TRP RTT-related measurements comprises:
determining the TRP RTT-related measurement $\Delta_{gNB}^1$ through direct measurements of the transmission time of the DL RS transmitted from the primary TRP and the reception time of the corresponding UL RS received from the UE; and
receiving the TRP RTT-related measurement $\Delta_{gNB}^2$, $\Delta_{gNB}^3$ from each secondary TRP and from each neighboring TRP.

6. The method of claim 4, wherein receiving the plurality of UE RTT-related measurements $\Delta_{UE}^1$, $\Delta_{UE}^2$, $\Delta_{UE}^3$ comprises:
receiving the plurality of UE RTT-related measurements $\Delta_{UE}^1$, $\Delta_{UE}^2$, $\Delta_{UE}^3$ from the UE.

7. The method of claim 4, wherein obtaining the plurality of UE RTT-related measurements $\Delta_{UE}^1$, $\Delta_{UE}^2$, $\Delta_{UE}^3$ comprises:
receiving the plurality of UE RTT-related measurements $\Delta_{UE}^1$, $\Delta_{UE}^2$, $\Delta_{UE}^3$ from the secondary TRP.

8. The method of claim 7,
wherein a non-coherent coordinated multipoint (CoMP) is in effect, and
wherein the secondary TRP is determined to have a higher link quality to the UE than the primary TRP.

9. The method of claim 4, wherein receiving the plurality of UE RTT-related measurements $\Delta_{UE}^1$, $\Delta_{UE}^2$, $\Delta_{UE}^3$ comprises:
receiving the plurality of UE RTT-related measurements $\Delta_{UE}^1$, $\Delta_{UE}^2$, $\Delta_{UE}^3$ from the UE; or
receiving the plurality of UE RTT-related measurements $\Delta_{UE}^1$, $\Delta_{UE}^2$, $\Delta_{UE}^3$ from the secondary TRP.

10. The method of claim 1, wherein the positioning entity is outside of any of the primary and secondary TRPs and is outside of the UE.

11. The method of claim 10, wherein obtaining the plurality of TRP RTT-related measurements comprises:
receiving all of the plurality of TRP RTT-related measurements $\Delta_{gNB}^1$, $\Delta_{gNB}^2$, $\Delta_{gNB}^3$ from a designated TRP, the designated TRP being the primary TRP or a secondary TRP.

12. The method of claim 11,
wherein the designated TRP is the primary TRP when no non-coherent coordinated multipoint (CoMP) is in effect, and
wherein the designated TRP is a serving TRP among the primary and secondary TRPs with a highest link quality when the non-coherent CoMP is in effect.

13. The method of claim 10, wherein obtaining the plurality of TRP RTT-related measurements comprises:
receiving individually the TRP RTT-related measurements $\Delta_{gNB}^1$, $\Delta_{gNB}^2$, $\Delta_{gNB}^3$ from each primary TRP, each secondary TRP, and each neighboring TRP.

14. The method of claim 10, wherein receiving the plurality of UE RTT-related measurements $\Delta_{UE}^1$, $\Delta_{UE}^2$, $\Delta_{UE}^3$ comprises:
receiving all of the plurality of UE RTT-related measurements $\Delta_{UE}^1$, $\Delta_{UE}^2$, $\Delta_{UE}^3$ from a designated TRP, the designated TRP being the primary TRP or one of the secondary TRP.

15. The method of claim 14,
wherein the designated TRP is the primary TRP when no non-coherent coordinated multipoint (CoMP) is in effect, and
wherein the designated TRP is a serving TRP among the primary and secondary TRPs with a highest link quality when the non-coherent CoMP is in effect.

16. A positioning entity, comprising:
at least one network interface or at least one transceiver or a combination thereof;
a memory; and
at least one processor communicatively coupled to the memory and the at least one transceiver,
wherein the at least one processor is configured to:
obtain a plurality of transmission-reception point (TRP) round trip time (RTT) related measurements, the plurality of TRP RTT-related measurements being one-to-one associated with a plurality of TRPs, wherein each TRP RTT-related measurement is associated with one TRP of the plurality of TRPs,
receive a plurality of user equipment (UE) RTT-related measurements via a primary TRP in data communication with the UE, wherein each of the plurality of UE RTT-related measurements is associated with one TRP of the plurality of TRPs; and
determine a position of a UE based on the plurality of TRP RTT-related measurements and the plurality of UE RTT-related measurements,
wherein:
a TRP RTT-related measurement associated with each TRP of the plurality of TRPs represents a duration between that TRP transmitting a downlink reference signal (DL RS) to the UE and that TRP receiving a corresponding uplink reference signal (UL RS) from the UE, and
a UE RTT-related measurement associated with each TRP of the plurality of TRPs represents a duration between the UE receiving the DL RS from that TRP and the UE transmitting the corresponding UL RS to that TRP, wherein for each TRP k,
the associated TRP RTT-related measurement is expressed as $\Delta_{gNB}^k = T_{gNB,Rx}^k - T_{gNB,Tx}^k$ in which $T_{gNB,Tx}^k$ represents a transmission time of the DL RS from that TRP and $T_{gNB,Rx}^k$ represents a reception time of the corresponding UL RS at that TRP, and
the associated UE RTT-related measurement is expressed as $\Delta_{UE}^k = T_{UE,Rx}^k - T_{UE,Tx}^k$ in which $T_{UE,Rx}^k$ represents a reception time of the DL RS at the UE and $T_{UE,Tx}^k$ represents a transmission time of the corresponding UL RS from the UE,
wherein the plurality of TRP RTT-related measurements comprise quantities one $\Delta_{gNB}^1$, zero or more $\Delta_{gNB}^2$, and zero or more $\Delta_{gNB}^3$ such that a total number of TRP RTT-related measurements is two or greater, the $\Delta_{gNB}^1$ corresponding to a primary TRP, each $\Delta_{gNB}^2$ corresponding to each secondary TRP in data communication with the UE, and each $\Delta_{gNB}^3$ corresponding to a neighboring TRP not in data communication with the UE, and
wherein the plurality of UE RTT-related measurements comprise quantities one $\Delta_{UE}^1$, zero or more $\Delta_{UE}^2$, and zero or more $\Delta_{UE}^3$ such that a total number of UE RTT-related measurements is two or greater, the $\Delta_{UE}^1$ corresponding to the primary TRP, each $\Delta_{UE}^2$ corresponding to each secondary TRP, and each $\Delta_{UE}^3$ corresponding to each neighboring TRP.

17. The positioning entity of claim 16, wherein the DL RS is a positioning reference signal (PRS) and/or the UL RS is a sounding reference signal (SRS).

18. The positioning entity of claim 16, wherein for at least one TRP k,
the $T_{UE,Rx}^k$, $T_{UE,Tx}^k$ measurements are derived from a received timing at the UE of a downlink radio subframe i from the TRP k defined by a first detected path in time, and a transmit timing at the UE of an uplink radio subframe i corresponding to the downlink radio subframe i, and/or
the $T_{gNB,Rx}^k$, $T_{gNB,Tx}^k$ measurements are derived from a received timing at the TRP k of the uplink radio subframe i defined by a first detected path in time, and a transmit timing at the TRP k of the downlink radio subframe.

19. The positioning entity of claim 16, wherein the positioning entity is outside of any of the primary and secondary TRPs and is outside of the UE.

20. The positioning entity of claim 19, wherein the at least one processor being configured to obtain the plurality of TRP RTT-related measurements comprises the at least one processor being configured to:
receive, via the at least one transceiver, all of the plurality of TRP RTT-related measurements $\Delta_{gNB}^1$, $\Delta_{gNB}^2$, $\Delta_{gNB}^3$ from a designated TRP, the designated TRP being the primary TRP or a secondary TRP.

21. The positioning entity of claim 20,
wherein the designated TRP is the primary TRP when no non-coherent coordinated multipoint (CoMP) is in effect, and
wherein the designated TRP is a serving TRP among the primary and secondary TRPs with a highest link quality when the non-coherent CoMP is in effect.

22. The positioning entity of claim 19, wherein the at least one processor being configured to obtain the plurality of TRP RTT-related measurements comprises the at least one processor being configured to:
receive, via the at least one transceiver, individually the TRP RTT-related measurements $\Delta_{gNB}^1$, $\Delta_{gnB}^2$, $\Delta_{gNB}^3$ from each primary TRP, each secondary TRP, and each neighboring TRP.

23. The positioning entity of claim 19, wherein the at least one processor being configured to receive the plurality of UE RTT-related measurements $\Delta_{UE}^1$, $\Delta_{UE}^2$, $\Delta_{UE}^3$ comprises the at least one processor being configured to:
receive, via the at least one transceiver, all of the plurality of UE RTT-related measurements $\Delta_{UE}^1$, $\Delta_{UE}^2$, $\Delta_{UE}^3$ from a designated TRP, the designated TRP being the primary TRP or one of the secondary TRP.

24. The positioning entity of claim 23,
wherein the designated TRP is the primary TRP when no non-coherent coordinated multipoint (CoMP) is in effect, and
wherein the designated TRP is a serving TRP among the primary and secondary TRPs with a highest link quality when the non-coherent CoMP is in effect.

25. A positioning entity, comprising:
means for obtaining a plurality of transmission-reception point (TRP) round trip time (RTT) related measurements, the plurality of TRP RTT-related measurements being one-to-one associated with a plurality of TRPs, wherein each TRP RTT-related measurement is associated with one TRP of the plurality of TRPs;
means for receiving a plurality of user equipment (UE) RTT-related measurements via a primary TRP in data communication with the UE, wherein each of the plurality of UE RTT-related measurements is associated with one TRP of the plurality of TRPs; and
means for determining a position of a UE based on the plurality of TRP RTT-related measurements and the plurality of UE RTT-related measurements,
wherein:
a TRP RTT-related measurement associated with each TRP of the plurality of TRPs represents a duration between that TRP transmitting a downlink reference signal (DL RS) to the UE and that TRP receiving a corresponding uplink reference signal (UL RS) from the UE, and
a UE RTT-related measurement associated with each TRP of the plurality of TRPs represents a duration between the UE receiving the DL RS from that TRP and the UE transmitting the corresponding UL RS to that TRP,
wherein for each TRP k,
the associated TRP RTT-related measurement is expressed as $\Delta_{gNB}^k = T_{gNB,Rx}^k - T_{gNB,Tx}^k$ in which $T_{gNB,Tx}^k$ represents a transmission time of the DL RS from that TRP and $T_{gNB,Rx}^k$ represents a reception time of the corresponding UL RS at that TRP, and
the associated UE RTT-related measurement is expressed as $\Delta_{UE}^k = T_{UE,Rx}^k - T_{UE,Tx}^k$ in which $T_{UE,Rx}^k$ represents a reception time of the DL RS at the UE and $T_{UE,Tx}^k$ represents a transmission time of the corresponding UL RS from the UE,
wherein the plurality of TRP RTT-related measurements comprise quantities one $\Delta_{gNB}^1$, zero or more $\Delta_{gNB}^2$, and zero or more $\Delta_{gNB}^3$ such that a total number of TRP RTT-related measurements is two or greater, the $\Delta_{gNB}^1$ corresponding to a primary TRP, each $\Delta_{gNB}^2$ corresponding to each secondary TRP in data communication with the UE, and each $\Delta_{gNB}^3$ corresponding to a neighboring TRP not in data communication with the UE, and wherein the plurality of UE RTT-related measurements comprise quantities one $\Delta_{UE}^1$, zero or more $\Delta_{UE}^2$, and zero or more $\Delta_{UE}^3$ such that a total number of UE RTT-related measurements is two or greater, the $\Delta_{UE}^1$ corresponding to the primary TRP, each $\Delta_{UE}^2$ corresponding to each secondary TRP, and each $\Delta_{UE}^3$ corresponding to each neighboring TRP.

26. The positioning entity of claim 25, wherein the DL RS is a positioning reference signal (PRS) and/or the UL RS is a sounding reference signal (SRS).

27. A non-transitory computer-readable medium storing computer-executable instructions for a positioning entity, the computer-executable instructions comprising:

one or more instructions causing the positioning entity to obtain a plurality of transmission-reception point (TRP) round trip time (RTT) related measurements, the plurality of TRP RTT-related measurements being one-to-one associated with a plurality of TRPs, wherein each TRP RTT-related measurement is associated with one TRP of the plurality of TRPs;

one or more instructions causing the positioning entity to receive a plurality of user equipment (UE) RTT-related measurements via a primary TRP in data communication with the UE, wherein each of the plurality of UE RTT-related measurements is associated with one TRP of the plurality of TRPs; and one or more instructions causing the positioning entity to determine a position of a UE based on the plurality of TRP RTT-related measurements and the plurality of UE RTT-related measurements, wherein:

a TRP RTT-related measurement associated with each TRP of the plurality of TRPs represents a duration between that TRP transmitting a downlink reference signal (DL RS) to the UE and that TRP receiving a corresponding uplink reference signal (UL RS) from the UE, and a UE RTT-related measurement associated with each TRP of the plurality of TRPs represents a duration between the UE receiving the DL RS from that TRP and the UE transmitting the corresponding UL RS to that TRP, wherein for each TRP k, the associated TRP RTT-related measurement is expressed as $\Delta_{gNB}^k = T_{gNB,Rx}^k - T_{gNB,Tx}^k$ in which $T_{gNB,Tx}^k$ represents a transmission time of the DL RS from that TRP and $T_{gNB,Rx}^k$ represents a reception time of the corresponding UL RS at that TRP, and the associated UE RTT-related measurement is expressed as $\Delta_{UE}^k = T_{UE,Rx}^k - T_{UE,Tx}^k$ in which $T_{UE,Rx}^k$ represents a reception time of the DL RS at the UE and $T_{UE,Tx}^k$ represents a transmission time of the corresponding UL RS from the UE, wherein the plurality of TRP RTT-related measurements comprise quantities one $\Delta_{gNB}^1$, zero or more $\Delta_{gNB}^2$, and zero or more $\Delta_{gNB}^3$ such that a total number of TRP RTT-related measurements is two or greater, the $\Delta_{gNB}^1$ corresponding to a primary TRP, each $\Delta_{gNB}^2$ corresponding to each secondary TRP in data communication with the UE, and each $\Delta_{gNB}^3$ corresponding to a neighboring TRP not in data communication with the UE, and wherein the plurality of UE RTT-related measurements comprise quantities one $\Delta_{UE}^1$, zero or more $\Delta_{UE}^2$, and zero or more $\Delta_{UE}^3$ such that a total number of UE RTT-related measurements is two or greater, the $\Delta_{UE}^1$ corresponding to the primary TRP, each $\Delta_{UE}^2$ corresponding to each secondary TRP, and each $\Delta_{UE}^3$ corresponding to each neighboring TRP.

28. The non-transitory computer-readable medium of claim 27, wherein the DL RS is a positioning reference signal (PRS) and/or the UL RS is a sounding reference signal (SRS).

* * * * *